(12) United States Patent
Hosokawa

(10) Patent No.: US 10,635,233 B2
(45) Date of Patent: *Apr. 28, 2020

(54) DISPLAY APPARATUS WITH INPUT FUNCTION

(71) Applicant: SHARP KABUSHIKI KAISHA, Sakai, Osaka (JP)

(72) Inventor: Teppei Hosokawa, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/509,870

(22) Filed: Jul. 12, 2019

(65) Prior Publication Data

US 2019/0332221 A1 Oct. 31, 2019

Related U.S. Application Data

(63) Continuation of application No. 15/923,882, filed on Mar. 16, 2018.

(30) Foreign Application Priority Data

Mar. 23, 2017 (JP) ................................. 2017-057501

(51) Int. Cl.
*G06F 3/041* (2006.01)
*G06F 3/14* (2006.01)
(Continued)

(52) U.S. Cl.
CPC ............ *G06F 3/0416* (2013.01); *G06F 3/048* (2013.01); *G06F 3/14* (2013.01); *G06F 3/04847* (2013.01)

(58) Field of Classification Search
CPC .......... G06F 3/0416; G06F 3/048; G06F 3/14; G06F 3/04847
See application file for complete search history.

(56) References Cited

U.S. PATENT DOCUMENTS 5,565,888 A * 10/1996 Selker ................. G06F 3/04895
715/823
5,712,995 A * 1/1998 Cohn ..................... G06F 3/0481
715/792

(Continued)

FOREIGN PATENT DOCUMENTS

| JP | H08-314681 A | 11/1996 |
| JP | 2006-244078 A | 9/2006 |
| JP | 2012-008628 A | 1/2012 |

OTHER PUBLICATIONS

Notice of Allowance and Fee(s) Due dated Apr. 12, 2019 for U.S. Appl. No. 15/923,882.

*Primary Examiner* — Ariel A Balaoing
(74) *Attorney, Agent, or Firm* — ScienBiziP, P.C.

(57) ABSTRACT

An information display device displays a sub-screen in a main screen and stores display information including the display position of the sub-screen and information on a near-field region. A position input device acquires information on a touched position, stores touch history information including information on a plurality of touched positions acquired, and includes a touched position determination section that determines whether a newly-acquired touched position is present in the near-field region and a display position determination section that, in a case where it has been determined that the newly-acquired touched position is present in the near-field region, utilizes the touch history information to determine a position to which the sub-screen is reduced or moved. In a case where the sub-screen has not been reduced, the sub-screen is reduced to the determined position. In a case where the sub-screen has been reduced, the sub-screen is moved to the determined position.

8 Claims, 16 Drawing Sheets

(51) Int. Cl.
*G06F 3/048* (2013.01)
*G06F 3/0484* (2013.01)

(56) References Cited

U.S. PATENT DOCUMENTS

| | | | |
|---|---|---|---|
| 9,648,062 B2* | 5/2017 | Chaudhri | G06F 3/0416 |
| 2003/0076362 A1* | 4/2003 | Terada | G06F 3/0486 |
| | | | 715/781 |
| 2004/0261037 A1* | 12/2004 | Ording | G06F 3/0481 |
| | | | 715/788 |
| 2006/0197751 A1 | 9/2006 | Iijima | |
| 2007/0250788 A1* | 10/2007 | Rigolet | G06F 3/0481 |
| | | | 715/788 |
| 2010/0125806 A1* | 5/2010 | Igeta | G06F 3/0481 |
| | | | 715/770 |
| 2011/0310123 A1 | 12/2011 | Matsubara | |
| 2013/0227472 A1* | 8/2013 | Sosinski | G06F 3/0481 |
| | | | 715/794 |

\* cited by examiner

DISPLAY APPARATUS WITH INPUT FUNCTION

BACKGROUND

1. Field

The present disclosure relates to display apparatuses with an input function and, in particular, to a display apparatus with an input function that has a multiple-window display function of displaying a plurality of display screens on one display device and makes it possible to input and display characters or the like by touching a display screen with a finger, a pen, or the like.

2. Description of the Related Art

Conventionally, an image display technology (picture-in-picture function) has been utilized with which to cause a display panel of one display device to simultaneously display a plurality of partly superimposed display screens showing different images, respectively. For example, one image A is displayed all over a main screen of the display panel, and a sub-screen showing another image B is displayed over a display region of a part of the image A thus displayed.

Further, a display apparatus with an input function has also been utilized in which a touch panel serving as a position input device that detects a position touched with a pen or a finger and a display screen are placed on top of each other and characters, graphics, or the like inputted by touch are displayed in a touched position on the display screen.

In a case where a user is inputting characters or the like into the main screen with a pen in a state where a plurality of display screens are displayed on such a display apparatus having a picture-in-picture function and including a touch panel, a sub-screen being displayed over a part of the main screen may constitute an obstacle. If the user would like to perform input on a display region in which the sub-screen is being displayed, the user has had to perform a series of actions of discontinuing the pen input, performing a predetermined operation to move or erase the sub-screen so that the region over which the sub-screen was displayed can be seen, and then resuming the pen input from the place where the user discontinued the pen input.

The series of actions that the user performs requires time and troublesome operations. Therefore, a device has been proposed which, in a case where a coordinate input pen has designated a position within the image B, which is a sub-screen, automatically makes the sub-screen transparent or semitransparent (see Japanese Unexamined Patent Application Publication No. 2006-244078).

Further, a device has been proposed which, in a case where a cursor or a pointer being displayed on a display screen overlaps in position with a segment in which a sub-screen (sub-window) is present or in a case where the distance between the display position of a sub-screen (second image) and the position of a cursor becomes less than a threshold, automatically moves the sub-screen from one display position to another, erases the sub-screen, or makes the sub-screen transparent (see Japanese Unexamined Patent Application Publication No. 2012-8628 and Japanese Unexamined Patent Application Publication No. 8-314681).

However, in such a conventional case where a series of troublesome actions is required, for example, to move a sub-screen, the operation of inputting characters or the like is discontinued. Therefore, for example, in a case where a user is making a presentation while adding characters or the like to the display content, the user bears a large burden of operation and cannot smoothly input characters or the like or explain the display content.

Further, the device that, for example, automatically moves a sub-screen fails to take into account the display position of characters or the like inputted by touch until then, the locus of a line segment inputted by touch, or the direction of touch. Therefore, the sub-screen may be moved to an inappropriate position. Moreover, suddenly moving the sub-screen to another position or making it transparent when the cursor, the pen, or the like overlaps in position with the sub-screen may not be appropriate for a person who is performing the input operation or a person who is looking at the display screen.

SUMMARY

It is desirable to provide a display apparatus with an input function that determines the display size and position of a sub-screen with reference to a history of touched positions inputted in the past and allows a user to more smoothly continue the inputting of characters or the like while looking at the displayed content.

According to an aspect of the disclosure, there is provided a display apparatus with an input function, including: a position input device through which to input information on a touched position; and an information display device that displays information, the position input device and the information display device being placed on top of each other, wherein the information display device includes a display panel that displays a first display screen and displays a second display screen in a display region of the first display screen, a first storage section storing display information including a display position of the second display screen and information on a near-field region including the second display screen and having a larger region than the second display screen, a reduction process section that reduces the second display screen, and a movement process section that moves the second display screen, the position input device includes a touch detection section that acquires the information on the touched position, a second storage section storing touch history information including information on a plurality of the touched positions thus acquired, a touched position determination section that determines whether a newly-acquired touched position is present in the near-field region specified by the display information, and a display position determination section that, in a case where the touched position determination section has determined that the newly-acquired touched position is present in the near-field region, utilizes the touch history information to determine position to which the second display screen is reduced or moved, in a case where the second display screen has not been reduced, the reduction process section reduces the second display screen to the position thus determined and displays the second display screen, and in a case where the second display screen has been reduced, the movement process section moves the second display screen to the position thus determined and displays the second display screen.

DESCRIPTION OF THE EMBODIMENTS

The following describes an embodiment of the present disclosure with reference to the drawings. It should be noted that the following description of the embodiment is not intended to limit the present disclosure.

Schematic Configuration of Display Apparatus with Input Function

Figure 1A:
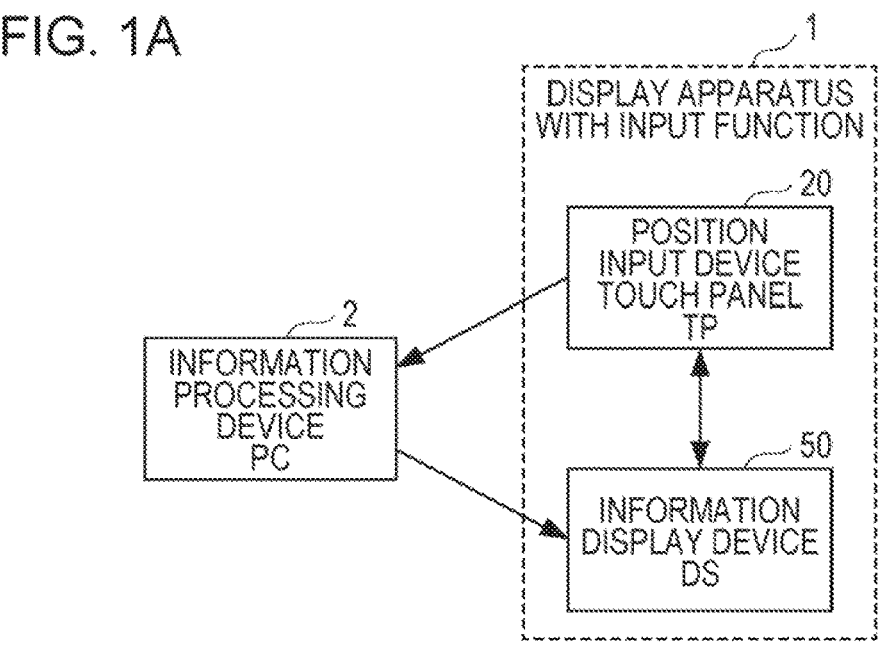
FIGS. 1A to 1C are schematic views showing a configuration of a display apparatus with an input function according to an embodiment of the present disclosure.
Figure 1B:
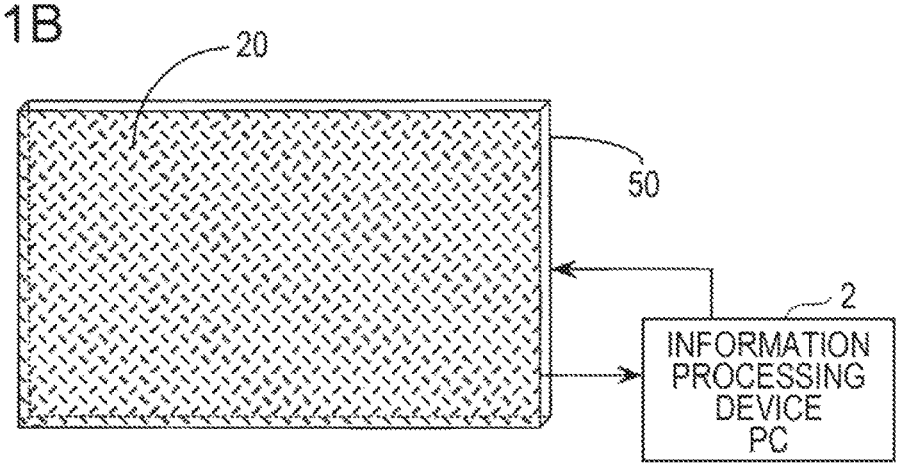
Figure 1C:
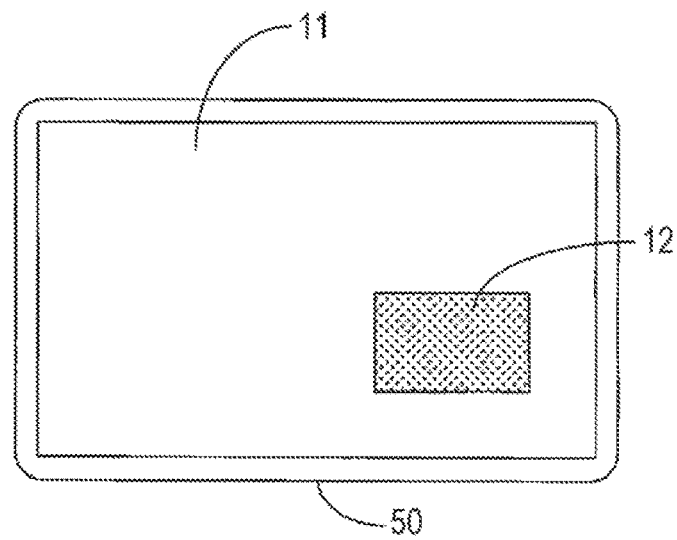

FIGS. 1A to 1C are schematic views showing a configuration of a display apparatus 1 with an input function according to an embodiment of the present disclosure. As shown in FIGS. 1A to 1C, the display apparatus 1 with an input function according to the embodiment of the present disclosure mainly includes a position input device 20 and an information display device 50. Further, the position input device 20 and the information display device 50 are placed on top of each other. For example, a tablet terminal, a smartphone, an electronic blackboard, a laptop PC, and the like are equivalent to the display apparatus 1 with an input function.

Further, as shown in FIG. 1A, the display apparatus 1 with an input function is connected to an information processing device 2 (hereinafter also referred to as "PC") such as a personal computer. In accordance with a request from the information processing device 2, the display apparatus 1 with an input function displays, on the information display device 50, image information that is supplied from the information processing device 2. The display apparatus 1 with an input function transmits information on a position touched with an input pen, a finger, or the like from the position input device 20 to the information processing device 2.

The position input device 20 is a device through which to input information on a position touched with an input pen, a finger, or the like. The position input device 20 is hereinafter also referred to as "touch panel TP". As shown in FIG. 1B, the touch panel TP is placed over the information display device 50. The touch panel TP is used for inputting information on a position touched with an input pen or the like. The touch panel TP outputs a signal representing the coordinates of a touched position.

It is on the basis of this signal representing the coordinates of a touched position that information (touch history information) indicating such a history of touched positions as that described below is stored. Further, the signal representing the coordinates of a touched position is supplied to the information processing device 2. Examples of methods for detecting a touched position include a capacitive method, an infrared ray insulating method, an infrared camera method, an electromagnetic induction method, a surface acoustic wave method, a resistive method, and the like. Any of these methods may be used.

The information display device 50 is a device (hereinafter also simply referred to as "display device" or "DS") that displays information. The information display device 50 mainly includes a display panel that displays information and a control unit that receives an image display request signal from the information processing device 2 and causes the display panel to display an image in accordance with the image display request signal. Usable examples of the display panel include a liquid crystal panel, an organic EL panel, and the like. The display apparatus 1 with an input function is manufactured by either joining the display panel and the touch panel, which are separate components, on top of each other or integrally molding the display panel and the touch panel.

Upon execution of an operation of drawing a line segment by touching the touch panel TP of the display apparatus 1 with an input function with an input pen, information on the touched position is transmitted to the information processing device PC. On the basis of the received information on the touched position, the PC transmits, to the display device DS, a display request signal for displaying the line segment in the touched position. The line segment is displayed in a position on the display screen that corresponds to the position where the line segment was drawn.

Further, as shown in FIG. 1C, the display apparatus 1 with an input function has a so-called multiple-window display function. A predetermined first image is displayed on a first display screen MD (main screen), which means the entire display screen of the display device DS 50, and a second display screen PIP (sub-screen) 12 having a somewhat small display region is simultaneously displayed over a display region of a part of the first display screen MD (main screen) 11. This second display screen PIP (sub-screen) 12 mainly shows a second image that is different from the first image that is displayed on the main screen MD. Note, however, that no part of the first image being displayed on the first display screen MD (main screen) is displayed in the display region in which the second display screen PIP (sub-screen) is being displayed.

The images to be displayed on the first display screen 11 and the second display screen PIP 12 are supplied from the information processing device PC to the display device DS 50. One or a plurality of the information processing devices PC may be connected to the display apparatus 1 with an input function. For example, in a case where two information processing devices PC are connected to the display apparatus 1 with an input function, a first image that is supplied from the first information device PC may be displayed on the first display screen MD (main screen), and a second image that is supplied from the second information processing device PC may be displayed on the second display screen PIP (sub-screen).

Further, one or a plurality of the second display screens PIP (sub-screens) having small display regions may be displayed at a time.

It should be noted that the display position of a second display screen PIP (sub-screen) is not fixed in the position shown in FIG. 1C but may be set in any position within the display screen of the display device DS 50. Further, the display position of a second display screen PIP (sub-screen) may be either set by the information processing device PC or freely changed by a user's touch input.

Further, according to the present disclosure, as will be described later, in a case where the second display screen PIP (sub-screen) 12 may constitute an obstacle when the user is inputting characters or the like with an input pen in touch with a region on the touch panel TP that corresponds to the display region of the first display screen MD (main screen), the second display screen PIP (sub-screen) is automatically reduced on the basis of touch history information obtained by storing positions of the user's touch input and then the second display screen PIP (sub-screen) is moved so as not to prevent the user's subsequent touch input. Note, however, that in a case where the second display screen PIP (sub-screen) does not prevent the subsequent touch input in its reduced state, the second display screen PIP (sub-screen) does not necessarily needs to be moved.

That is, according to the present disclosure, the processes of reducing and moving the second display screen PIP (sub-screen) 12 are executed in two stages on the basis of the touch history information, whereby the burden of input operation on the user is reduced by allowing smooth continuation of the input operation of the user on the touch panel in a state where a plurality of display screens (multiple windows) are being displayed.

Configuration of Position Input Device (Touch Panel)

Figure 2:
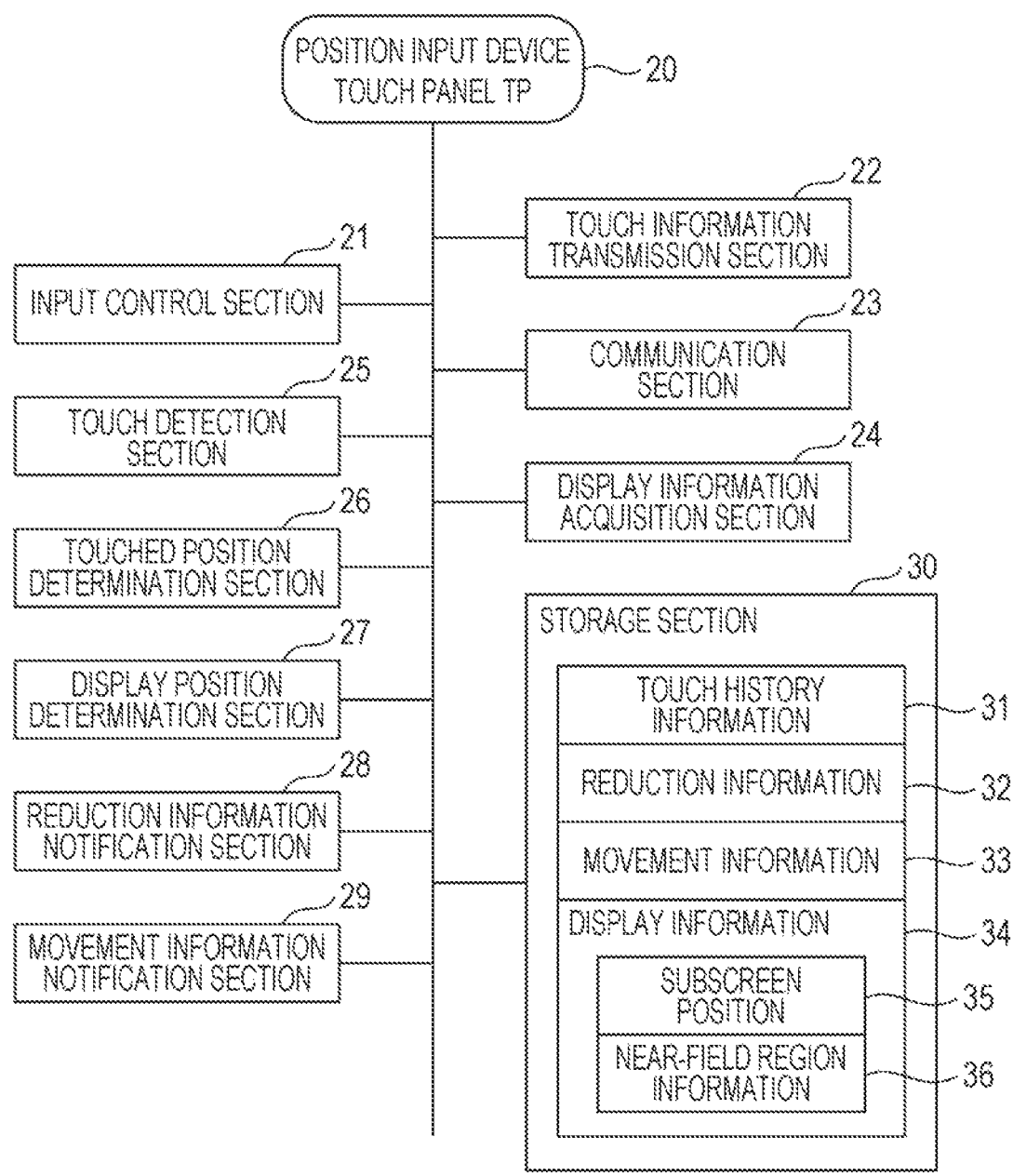
FIG. 2 is a block diagram showing a configuration of a position input device (touch panel) of the display apparatus with an input function according to the embodiment of the present disclosure.

FIG. 2 is a block diagram showing a configuration of the position input device 20 (touch panel TP) of the display apparatus 1 with an input function according to the embodiment of the present disclosure.

As shown in FIG. 2, the position input device 20 (touch panel TP) according to the embodiment of the present disclosure mainly includes an input control section 21, a touch information transmission section 22, a communication section 23, a display information acquisition section 24, a touch detection section 25, a touched position determination section 26, a display position determination section 27, a reduction information notification section 28, a movement information notification section 29, and a storage section 30.

The input control section 21 is a section that controls the operation of each constituent element such as the touch detection section 25, and is mainly realized by a microcomputer including a CPU, a ROM, a RAM, an I/O controller, a timer, and the like.

The CPU organically actuates various types of hardware on the basis of a control program stored in advance in the ROM or the like and executes the touch detection function, the communication function, or other functions of the position input device 20 (touch panel TP) according to the embodiment of the present disclosure.

The touch information transmission section 22 is a section that transmits, to the PC, information on a position touched by an input pen or the like. In a case where a position on the touch panel TP is represented by orthogonal XY coordinates, the coordinates (x, y) of the touched position is transmitted to the PC.

The communication section 23 is a section that is equivalent to a second communication section and communicates with the display device DS. The communication section 23 transmits information acquired or generated through the touch panel TP to the display device DS and receives display information from the display device DS. For example, the communication section 23 may transmit, to the display device DS, at least either or both of information on a position determined by the after-mentioned display position determination section 27 as a position to which the sub-screen PIP is reduced and information on a position determined by the after-mentioned display position determination section 27 as a position to which the sub-screen PIP is moved. Note, however, that in a case where the sub-screen PIP is reduced, the communication section 23 may transmit, to the display device DS, only information (reduction information) pertaining to the size and position to which the sub-screen PIP is reduced.

The display information acquisition section 24 is a section that acquires display information sent from the display device DS. For example, the display information acquisition section 24 acquires a sub-screen position and near-field region information that are included in the display information thus received and stores them in the storage section 30.

The touch detection section 25 is a section that detects the touch of the touch panel TP with an input pen, a finger, or the like and acquires information (touched position coordinates) on the touched position. The information on the touched position thus acquired is transmitted by the touch information transmission section 22 to the PC and, at predetermined time intervals, is stored as touch history information 31 in the storage section 30.

The touched position determination section 26 is a section that determines whether the touched position thus acquired is present in the display position of the sub-screen PIP or a near-field region specified by the after-mentioned display information. The near-field region is such a region as that shown in FIGS. 4B and 4C, which will be described later. For example, in a case where the information (touched position coordinates) on the touched position falls within the range of display coordinates indicating the display region of the sub-screen PIP that corresponds to the touch panel TP, the touched position determination section 26 determines that the touched position is present in the display position of the sub-screen PIP. Further, in a case where the information (touched position coordinates) on the touched position falls within the range of display coordinates indicating the near-field region that corresponds to the touch panel TP, the touched position determination section 26 determines that the touched position is present in the near-field region.

In a case where the touched position determination section 26 has determined that the touched position thus acquired is present in the near-field region or the display position of the sub-screen PIP, the after-mentioned display position determination section 27 determines the position to which the sub-screen PIP is reduced and the position to which the sub-screen PIP is moved. Further, in a case where the touched position approaches the near-field region or the display position of the sub-screen PIP with the passage of time on the basis of the touch history information 31 stored in the storage section 30, the distance between the touched position and the near-field region or the like and the direction in which the touched position approaches the near-field region or the like (direction of movement of the touched position) may be detected.

The display position determination section 27 is a section that, in a case where the touched position determination section 26 has determined that a newly-acquired touched position is present in the near-field region or the display position of the sub-screen PIP, determines, with reference to the touch history information 31 stored in the storage section 30, the position to which the sub-screen PIP is reduced and the position to which the sub-screen PIP is moved. Alternatively, instead of directly determining the size and display position to which the sub-screen PIP is reduced and the display position to which the sub-screen PIP is moved, the display position determination section 27 needs only determine the area of placement of and the direction of movement of the sub-screen PIP with respect to the entire display screen of the display device DS.

According to the present disclosure, assuming that a two-stage process by which the process of reducing the sub-screen PIP is followed by the process of moving the sub-screen PIP is performed in a case where the display position of the sub-screen PIP may affect the user's touch input, the sub-screen PIP is first reduced to the determined position of reduction in a case where the sub-screen PIP has not been reduced yet. That is, the size and display position of the sub-screen PIP after reduction are determined.

Criteria for reduction need only be set in advance; for example, the original sub-screen PIP may be reduced to approximately ¼ in area ratio. Alternatively, some reduction ratios may be set in advance so that the sub-screen PIP may be made gradually smaller. Further, the reduction ratios may be user-configurable.

Further, the position in which the sub-screen PIP after reduction is displayed may be determined according to such criteria as those mentioned below to be such a position as not to affect touch input after the reduction of the sub-screen PIP. Information on the display position and size thus determined of the sub-screen PIP after reduction is transmitted as reduction information by the after-mentioned reduction information notification section 28 to the display device DS.

Next, for example, in a case where the sub-screen PIP has been reduced once, the sub-screen PIP is moved to the determined position of movement. That is, the display position of the sub-screen PIP after movement is determined. Further, the number of reductions and the maximum reduction ratio may be set in advance so that the sub-screen PIP may be moved in a case where a reduction process has been performed the number of reductions thus set or a case where a reduction has already been made at the maximum reduction ratio.

Criteria for moving the sub-screen PIP need only be set in advance, and according to such criteria as those mentioned below, such a position needs only be determined as to be not likely to affect the subsequent touch input. For example, in a case where the entire display screen of the display device DS is segmented into some segmented regions and there is a segmented region including none of the touched positions stored as the touch history information, it may be determined that the sub-screen PIP moves into the segmented region. Alternatively, it is possible to compute, from some recent touched positions stored as the touch history information, the locus and direction of movement of a touched position until the present time, to predict, on the basis of the locus of movement and the like, the direction of movement of the position to be touched in the future, and to determine that the sub-screen PIP moves into a segmented region that does not lie in the direction of movement thus predicted. Information on the display position thus determined of the sub-screen PIP after movement is transmitted as movement information by the after-mentioned movement information notification section 29 to the display device DS.

Further, the size of the sub-screen PIP after movement may be the same as the size of the sub-screen PIP after reduction. Note, however, that the sub-screen PIP after movement may be returned to the same size as the original sub-screen PIP.

It should be noted that, in the touch panel TP, the display position determination section 27 may execute both a reduction determination process and a movement determination process on the basis of the touch history information and transmit the reduction information and movement information thus determined to the display device DS. In this case, the display device DS determines whether the process of reducing the sub-screen PIP or the process of moving the sub-screen PIP is performed.

The reduction information notification section 28 is a section that transmits, to the display device DS, the reduction information on the sub-screen PIP as determined by the display position determination section 27. The movement information notification section 29 is a section that transmits, to the display device DS, the movement information on the sub-screen PIP as determined by the display position determination section 27.

In a case where the touch panel TP determines whether the sub-screen PIP is reduced or moved, it is only necessary, for example, to, in a case where no reduction determination has been made, perform the reduction determination process of determining the position of the sub-screen PIP after reduction and transmit only the reduction information on the sub-screen PIP to the display device DS and to, once a reduction determination is made, perform the movement determination process of determining the position of the sub-screen PIP after movement and transmit only the movement information on the sub-screen PIP to the display device DS.

On the other hand, in a case where the display device DS determines whether the sub-screen PIP is reduced or moved, it is only necessary to execute both the reduction determination process and the movement determination process through the touch panel TP and transmit, to the display device DS, the reduction information by which the position of the sub-screen PIP after reduction is set and the movement information by which the position of the sub-screen PIP after movement is set.

The storage section 30 is a section that is equivalent to a second storage section and stores information and programs that are necessary for executing the functions of the touch panel TP. Usable examples of the storage section 30 include: a semiconductor storage element such as a ROM, a RAM, a flash memory; a storage device such as an HDD and an SSD; and other storage media.

A program is stored in the ROM. Information that is temporarily utilized is stored in the RAM. Information that is set in advance is stored in a nonvolatile rewritable storage element such as the flash memory.

In the storage section 30, for example, the touch history information 31, reduction information 32, movement information 33, and display information 34 are stored. The display information 34 is information pertaining to the sub-screen PIP that is acquired from the display device DS, and is information including a sub-screen position 35 and near-field region information 36.

The touch history information 31 includes information on a plurality of touched positions acquired by the touch detection section 25 and is obtained by storing, for a predetermined period of time, information (touched position coordinates) indicating touched positions on the touch panel TP. For example, touched position coordinates acquired every 100 milliseconds are stored as a history for a period from a time ten second ago to the present time. Alternatively, touched position coordinates from a position on the touch panel TP that an input pen first touched (touched down) to a position on the touch panel TP from which the input pen moved away (touched up) may be stored as a history at intervals of 100 milliseconds.

The reduction information 32 is information pertaining to the sub-screen PIP in a case where the sub-screen PIP is reduced, and includes, for example, information on the display position of the sub-screen PIP after reduction and information on a near-field region corresponding to the sub-screen PIP after reduction. The information on the display position of the sub-screen PIP after reduction may be coordinate information that specifies the display position and size of the sub-screen PIP and, in a case where the display screen of the display device DS is segmented into some segmented regions, may designate a segmented region in which the sub-screen PIP after reduction should be displayed.

The near-field region is a region that includes the sub-screen PIP and is larger than the sub-screen PIP. In a case where the sub-screen PIP has a rectangular shape whose transverse length is W0 and longitudinal length is L0, the near-field region is a rectangular region that includes the sub-screen PIP therein and has, around the display region of the sub-screen PIP, a width that is larger by a predetermined distance. As shown in FIG. 4B, which will be described later, assuming that the near-field region is sized to have a transverse length W1 and a longitudinal length L1, W1>W0 and L1>L0.

This near-field region is a region for detecting the approach of a position of touch or a history of touches with an input pen or the like to the display position of the sub-screen PIP. For example, in a case where a touched position detected by the touch detection section 25 is within the near-field region and outside the region of the sub-screen PIP, the size and display position to which the sub-screen PIP is reduced are determined and the reduction information 32 is generated. In a case where the sub-screen PIP is reduced, the reduced sub-screen PIP is displayed in the determined position on the basis of the reduction information 32 thus generated.

The movement information 33 is information pertaining to the sub-screen PIP in a case where the sub-screen PIP is moved, and includes, for example, information on the display position of the sub-screen PIP after movement and information on a near-field region corresponding to the sub-screen PIP after movement. The information on the display position of the sub-screen PIP after movement may be coordinate information that specifies the display position and size of the sub-screen PIP and, in a case where the display screen of the display device DS is segmented into some segmented regions, may designate a segmented region in which the sub-screen PIP after movement should be displayed.

In a case where a touched position detected by the touch detection section 25 is within the near-field region and outside of the region of the sub-screen PIP, the display position to which the sub-screen PIP is moved is determined and the movement information 33 is generated. Alternatively, in a case where a history of touched positions stored is within the near-field region and further enters the region of the sub-screen PIP, the movement information 33 may be generated. In a case where the sub-screen PIP is moved, the sub-screen PIP is displayed in the determined position, to which the sub-screen PIP should be moved, on the basis of the movement information 33 thus generated.

As described above, the display information 34 is information including the sub-screen position 35 and the near-field region information 36. The sub-screen position 35 is information (position coordinates) indicating the display position of the sub-screen PIP currently displayed on the display screen of the display device DS. The near-field region information 36 is information that indicates the position of a near-field region corresponding to the currently-displayed sub-screen PIP.

Further, since the display position of the current sub-screen PIP is stored in the display device DS, the display information 34 is transmitted from the display device DS in the case of such a change in the size or display position of the sub-screen PIP as a reduction or movement of the sub-screen PIP. Note, however, that the display information 34 may be regularly transmitted from the display device DS.

It should be noted that although the display information 34 that is transmitted from the display device DS includes the near-field region information 36, the display information 34 that is transmitted from the display device DS does not need to include the near-field region information 36 in a case where the touch panel TP manages the size of a near-field region. In this case, the touch panel TP needs only compute the near-field region information 36 from the sub-screen position 35 that is transmitted from the display device DS.

Figure 4A:
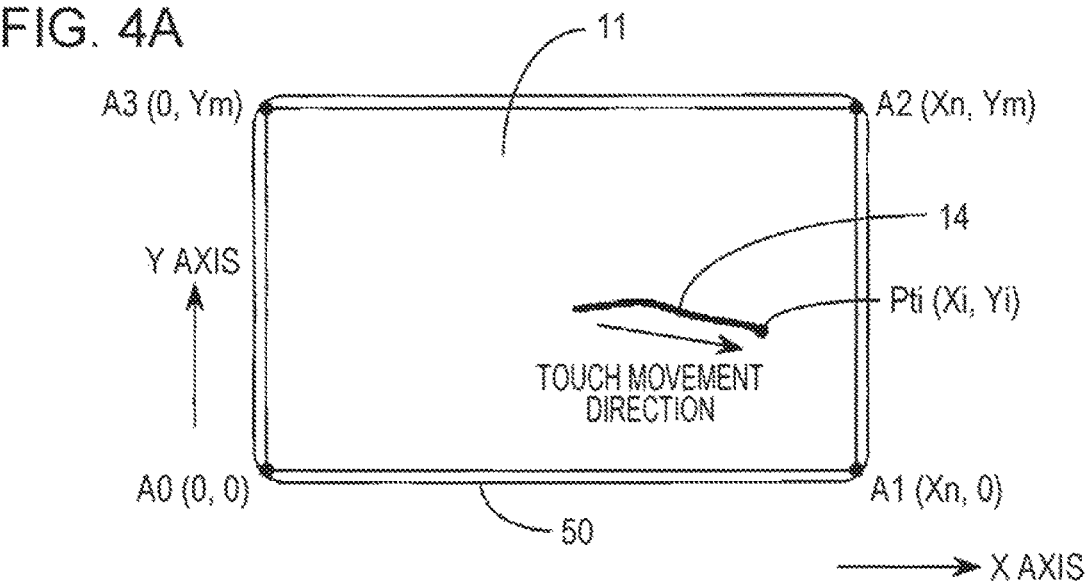
FIGS. 4A to 4C are schematic explanatory diagrams of display screens and touched positions in the display apparatus with an input function according to the embodiment of the present disclosure.
Figure 4B:
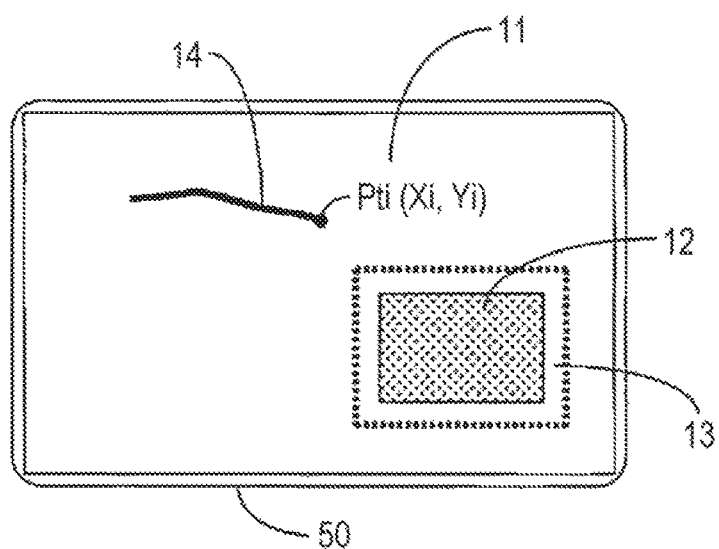
Figure 4C:
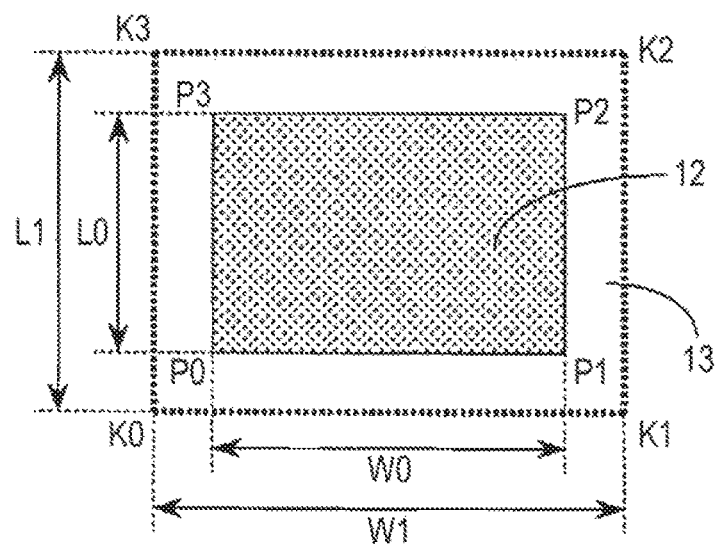

FIGS. 4A to 4C are schematic explanatory diagrams of display screens and touched positions in the display apparatus 1 with an input function according to the embodiment of the present disclosure. FIG. 4A shows an example display of a first display screen (main screen) MD that is displayed all over the display panel of the display device DS and a line segment inputted by touch to the touch panel TP placed over the first display screen (main screen) MD.

FIG. 4A assumes that the first display screen (main screen) MD has a rectangular shape and that, in order to specify the display position of the first display screen (main screen) MD, XY coordinates are set so that the origin point is located in a lower left position on the main screen MD, the X axis extends in a transverse direction, and the Y axis extends in a longitudinal direction. Assuming that A0 (0, 0) is the origin point of the XY coordinates, Xn is the number of pixels in the X axis direction, and Ym is the number of pixels in the Y axis direction, A1 (Xn, 0), A3 (0, Ym), and A2 (Xn, Ym) represent lower right, upper right, and upper left positions on the main screen MD, respectively. In a case where a sub-screen PIP is displayed, the display position of the sub-screen PIP is represented by the XY coordinates.

Further, FIG. 4A also shows a touch history 14 in a case where a line segment is inputted by a user bringing an input pent into touch with the touch panel TP placed over the first display screen (main screen) MD. The touch history 14 is a displayed locus of the pen. Assuming that the direction of movement of the input pen (touch movement direction) is the direction of the arrow, the coordinates of the current touched position Pti is for example represented by (Xi, Yi). Note here that, assuming that the coordinates of a touched position on the touch panel TP and the coordinates of the display position of the main screen MD are in one-to-one correspondence, the touched position Pti (Xi, Yi) of the input pen is also the coordinates of the display position.

FIG. 4B shows an example display of a second display screen (sub-screen) PIP 12 and a near-field region NF 13 displayed on a part of the first display screen (main screen) MD and a touch history 14 of a line segment inputted to the first display screen (main screen) MD. In a case where the second display screen (sub-screen) PIP 12 has a rectangular shape, the near-field region NF 13 has a rectangular shape that is slightly larger than the sub-screen PIP. The position of the near-field region NF corresponding to the sub-screen PIP is also represented by the XY coordinates shown in FIG. 4A.

Further, in FIG. 4B, the line segment indicated by the touch history 14 and the current touched position Pti (Xi, Yi) are outside of the near-field region NF, and in such a state as that shown in FIG. 4B where the sub-screen PIP does not constitute an obstacle to touch input from the input pen, the sub-screen PIP does not need to be reduced or moved.

FIG. 4C shows an example of a positional relationship between the second display screen (sub-screen) PIP 12 and the near-field region NF 13. The sub-screen PIP is a rectangular region surrounded by four apices (P0, P1, P2, and P3), and the near-field region NF is a rectangular region surrounded by four apices (K0, K1, K2, and K3).

Note here that W1>W0 and L1>L0, where W0 is the transverse length of the sub-screen PIP, L0 is the longitudinal length of the sub-screen PIP, W1 is the transverse length of the near-field region NF, and L1 is the longitudinal length of the near-field region NF. Further, for example, the sub-screen position 35 and the near-field region information 36 are specified by the XY coordinates of the four apices of each of the rectangular shapes.

The size and display position of the sub-screen PIP to be displayed are determined, for example, by the settings that the user configures for the display device DS. Further, the transverse and longitudinal lengths of the near-field region NF need only be set to be for example approximately 20 to 40% larger than the transverse and longitudinal lengths of the sub-screen PIP. Note, however, that while the transverse and longitudinal lengths of the near-field region NF may be fixedly set in advance, the transverse and longitudinal lengths of the near-field region NF may also be user-configurable, as appropriate values of the transverse and longitudinal lengths of the near-field region NF vary depending on the sizes of the main screen MD and the sub-screen PIP, the resolution of a signal being inputted to the main screen MD, and the like.

Configuration of Information Display Device

Figure 3:
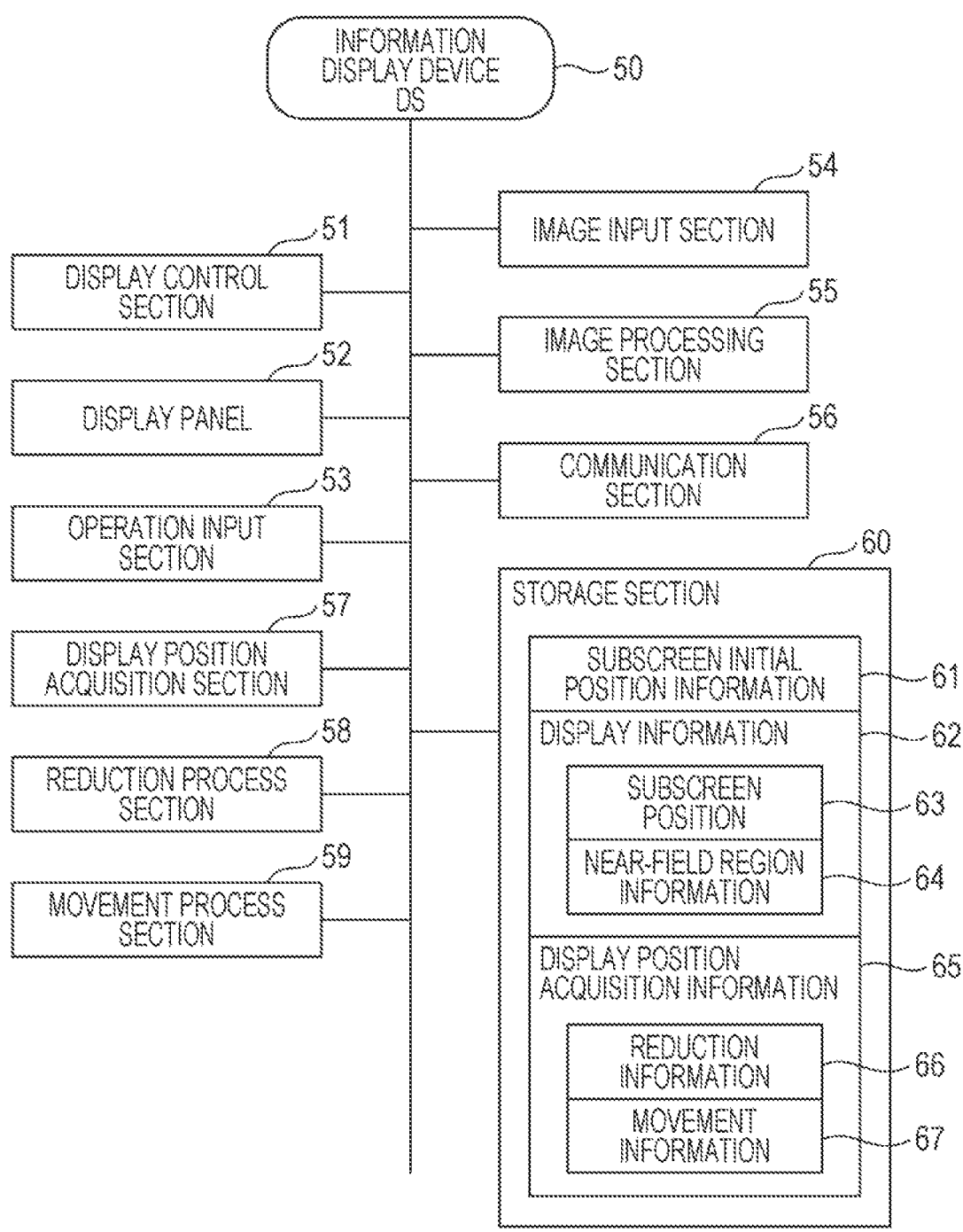
FIG. 3 is a block diagram showing a configuration of an information display device according to the embodiment of the present disclosure.

FIG. 3 is a block diagram showing a configuration of the information display device DS 50 according to the embodiment of the present disclosure. As shown in FIG. 3, the information display device DS 50 according to the embodiment of the present disclosure mainly includes a display control section 51, a display panel 52, an operation input section 53, an image input section 54, an image processing section 55, a communication section 56, a display position acquisition section 57, a reduction process section 58, a movement process section 59, and a storage section 60.

The display control section 51 is a section that controls the operation of each constituent element such as the image input section 54 and the communication section 56, and is mainly realized by a microcomputer including a CPU, a ROM, a RAM, an I/O controller, a timer, and the like.

The CPU organically actuates various types of hardware on the basis of a control program stored in advance in the ROM or the like and executes the display function, the function of reducing a sub-screen PIP, the function of moving a sub-screen PIP, the communication function, or other functions of the display device DS.

The display panel 52 is a section that displays an image. In particular, according to the present disclosure, the display panel 52 displays a first display screen (main screen MD) all over the panel and displays a second display screen (sub-screen PIP) in a display region of the first display screen (main screen MD). Further, the display panel 52 displays predetermined images in the main screen MD and the sub-screen PIP in accordance with display signals that are supplied from the display control section 51. Usable examples of the display panel 52 include a liquid crystal panel, an organic EL panel, and the like.

The operation input section 53 is a section through which a user performs, an image displayed on the display panel 52, an operation of executing a predetermined function. Usable examples of the operation input section 53 include a keyboard and a remote controller.

The image input section 54 is a section through which to input a video signal for displaying an image that is supplied from an information processing device PC such as a personal computer, and has an interface that complies with a predetermined video standard such as analog RGB, DVI, or HDMI (registered trademark). The video signal that is inputted may be either analog or digital.

The image processing section 55 is a section that converts an inputted video signal into a signal that can be displayed on the display panel 52. For example, a video signal representing an image to be displayed on the sub-screen PIP is adjusted so that the image is displayed in the predetermined display position of the sub-screen PIP.

The communication section 56 is a section that is equivalent to a first communication section and communicates with the touch panel TP. The communication section 56 transmits display information 62 stored in the storage section 60 to the touch panel TP. The display information 62 is information pertaining to the display position of the sub-screen PIP currently displayed on the display device DS and a near-field region. Further, the communication section 56 receives information (display position acquisition information) pertaining to the display position of the sub-screen PIP that is sent from the touch panel TP. The display position acquisition information is equivalent to reduction information and movement information generated by the touch panel TP.

The display position acquisition section 57 is a section that acquires information (display position acquisition information) pertaining to the display position of the sub-screen PIP that is sent from the touch panel TP and stores the display position acquisition information in the storage section 60. The display position acquisition information includes information (reduction information) pertaining to the display position of the sub-screen PIP after reduction and information (movement information) pertaining to the display position of the sub-screen PIP after movement.

The reduction process section 58 is a section that reduces a sub-screen PIP on the basis of acquired information (reduction information) pertaining to the display position of the sub-screen PIP after reduction. For example, in a case where the sub-screen PIP has not been reduced once, the reduction process section 58 utilizes the reduction information to determine the size and display position of the sub-screen PIP, reduces the sub-screen PIP to the position of reduction thus determined, and displays the sub-screen PIP.

The movement process section 59 is a section that moves a sub-screen PIP on the basis of acquired information (movement information) pertaining to the display position of the sub-screen PIP after movement. For example, in a case where the sub-screen PIP has been reduced, the movement process section 59 utilizes the movement information to determine a display position to which the sub-screen PIP is moved, moves the sub-screen PIP to the position of movement thus determined, and displays the sub-screen PIP.

The storage section 60 is a section that is equivalent to a second storage section and stores information and programs that are necessary for executing the functions of the display device DS. Usable examples of the storage section 60 include: a semiconductor storage element such as a ROM, a RAM, a flash memory; a storage device such as an HDD and an SSD; and other storage media.

A program is stored in the ROM. Information that is temporarily utilized is stored in the RAM. Information that is set in advance is stored in a nonvolatile rewritable storage element such as the flash memory.

In the storage section 60, for example, sub-screen initial position information 61, the display information 62, and display position acquisition information 65 are stored. Further, the display information 62 includes such a sub-screen position 63 indicating the display position of a second display screen (sub-screen PIP) as that described above and such near-field region information 64 as that described above. The display position acquisition information 65 includes such reduction information 66 as that described above and such movement information 67 as that described above.

The sub-screen initial position information 61 is information that indicates a display position in which the sub-screen PIP was first displayed. The sub-screen initial position information 61 is utilized in a case where there has been no touch input from an input pen since the sub-screen PIP was reduced or moved or when the sub-screen PIP is returned by the user's instruction input or the like to an initial state in which the sub-screen PIP was first displayed.

The sub-screen position 63 and the near-field region information 64, which are included in the display information 62, are information pertaining to the sub-screen PIP currently displayed on the display device DS. Further, the reduction information 66 and the movement information 67, which are included in the display position acquisition information 65, are equivalent to the reduction information 32 and the movement information 33, which are generated by the touch panel TP.

Explanation of Reduction of Second Display Screen (Sub-Screen) and Change in Display Position>

According to the present disclosure, such a touch history 14 of an input pen as that described above is utilized to reduce a sub-screen PIP and further move the sub-screen PIP on the basis of a relationship between the display position of the sub-screen PIP, a near-field region, and the touched position and touch movement direction of the touch panel TP.

FIGS. 5A to 5D are explanatory diagrams of a process of reducing a second display screen (sub-screen) on the basis of a relationship between the display position of the second display screen and a touch history according to the embodiment of the present disclosure.

Figure 5C:
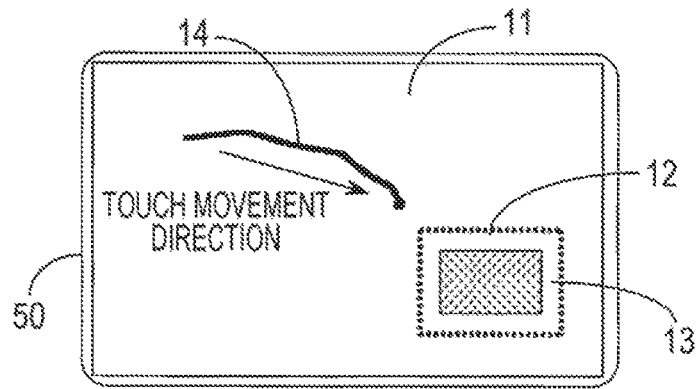
Figure 6A:
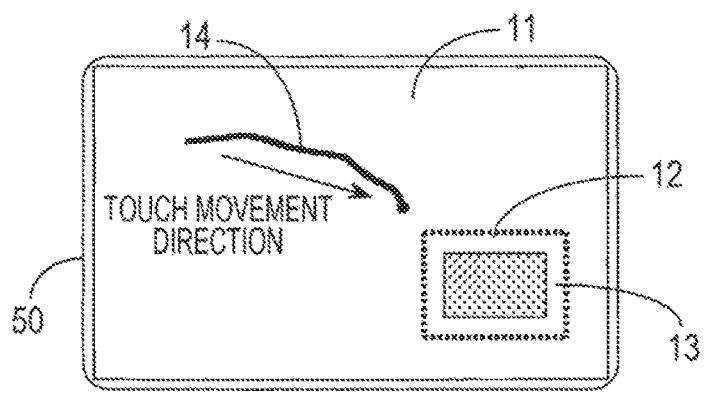
FIGS. 6A to 6D are explanatory diagrams of a process of moving the second display screen (sub-screen) on the basis of the relationship between the display position of the second display screen and the touch history according to the embodiment of the present disclosure.

FIGS. 6A to 6D are explanatory diagrams of a process of moving the second display screen (sub-screen) on the basis of the relationship between the display position of the second display screen and the touch history according to the embodiment of the present disclosure. In this embodiment, the sub-screen PIP is reduced first and then moved. FIGS. 5C and 6A are explanatory diagrams showing the same state where the sub-screen PIP has been reduced.

Figure 5A:
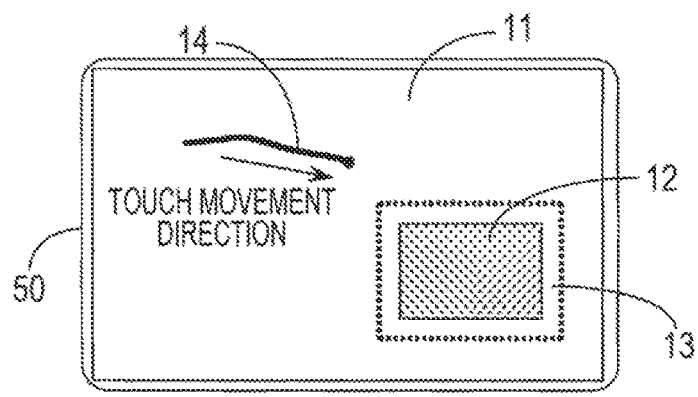
FIGS. 5A to 5D are explanatory diagrams of a process of reducing a second display screen (sub-screen) on the basis of a relationship between the display position of the second display screen and a touch history according to the embodiment of the present disclosure.

FIG. 5A shows a state where a main screen MD 11 is being displayed all over the display screen of the display device DS 50 and a sub-screen PIP 12 is being displayed in a lower right region of the main screen MD. Further, a near-field region NF 13 which is slightly larger than a display region of the sub-screen PIP is indicated by a dashed line. Furthermore, it is assumed that input is started by an input pen being brought into touch with an upper left part of a display region of the main screen MD and the input pen is moved in the direction of the arrow while being kept in touch. The line segment indicates a touch history 14 of the input pen.

Although, in FIG. 5A, the touch history 14 of the input pen is approaching in the direction of the near-field region NF, the sub-screen PIP is kept displayed without change, as the touch history 14 of the input pen has not entered the near-field region NF yet.

Figure 5B:
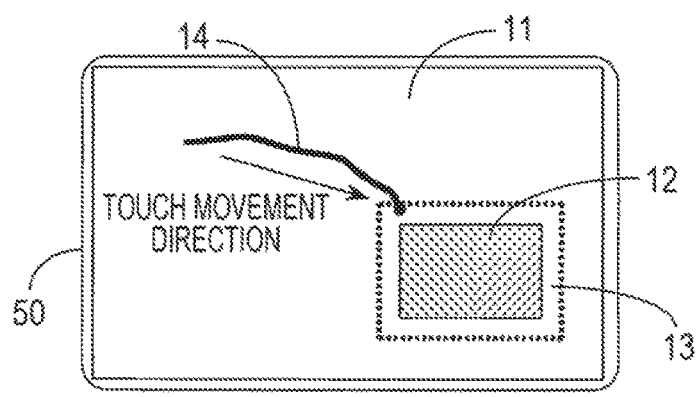

FIG. 5B shows a state where the input pen continues the touch input and has been brought into touch with an upper left part of the near-field region NF. In this case, the touched position determination section 26 determines that a touched position acquired by the touch detection section 25 is present in the near-field region NF. Further, since the touched position determination section 26 has determined that the touched position thus acquired is present in the near-field region NF, the display position determination section 27 utilizes the touch history 14 to determine a position in which the sub-screen PIP is displayed. Specifically, the position to which the sub-screen PIP should be reduced and the position to which the sub-screen PIP should be moved are determined. Note, however, that in a case where the sub-screen PIP has not been reduced once yet since the sub-screen PIP was initially displayed, only the position to which the sub-screen PIP should be reduced may be determined. For example, as shown in FIG. 5C, the display position of the sub-screen PIP is determined so that the sub-screen PIP is reduced in a lower right direction in the display region of the main screen MD, i.e. in a direction away from the current touched position.

FIGS. 7A to 7C, FIGS. 8A and 8B, and FIGS. 9A and 9B are explanatory diagrams of the display position, based on a touch history, of a second display screen (sub-screen PIP) after reduction according to the embodiment of the present disclosure.

Here, three display positions of a sub-screen PIP after reduction are shown.

Figure 7A:
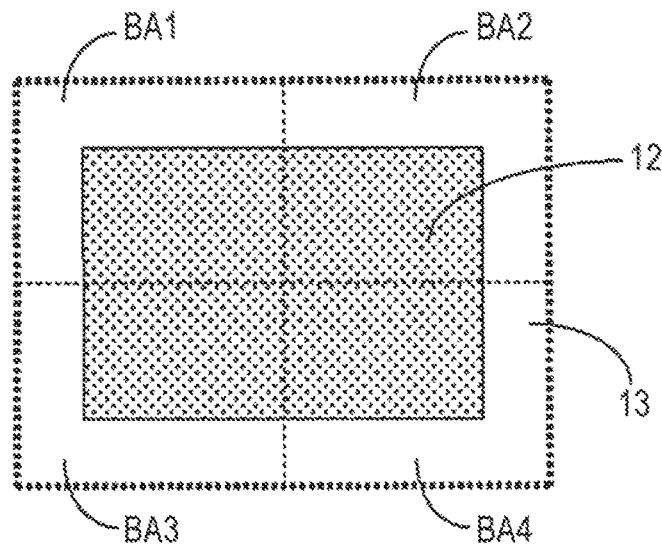
FIGS. 7A to 7C are explanatory diagrams of the display position, based on a touch history, of a second display screen (sub-screen) after reduction according to the embodiment of the present disclosure.

FIG. 7A shows four segmented regions (BA1 to BA4) into which the sub-screen PIP and the near-field region NF have been segmented in vertical and horizontal directions.

A method for determining the display position of a sub-screen PIP after reduction includes, when a touch inputted position has first entered the near-field region NF, checking in which segmented region of the near-field region NF the touched position is present and reducing the sub-screen PIP in a diagonal direction of the segmented region in which the touched position is present.

Figure 7B:
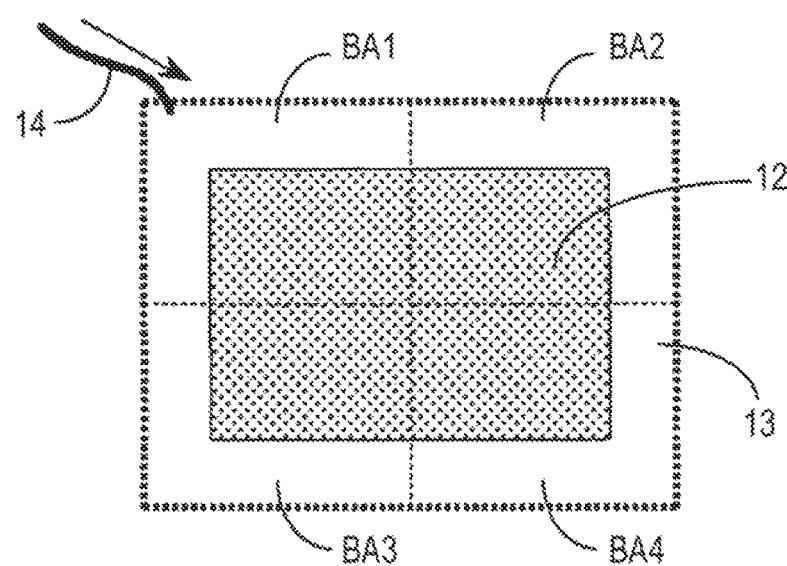
Figure 7C:
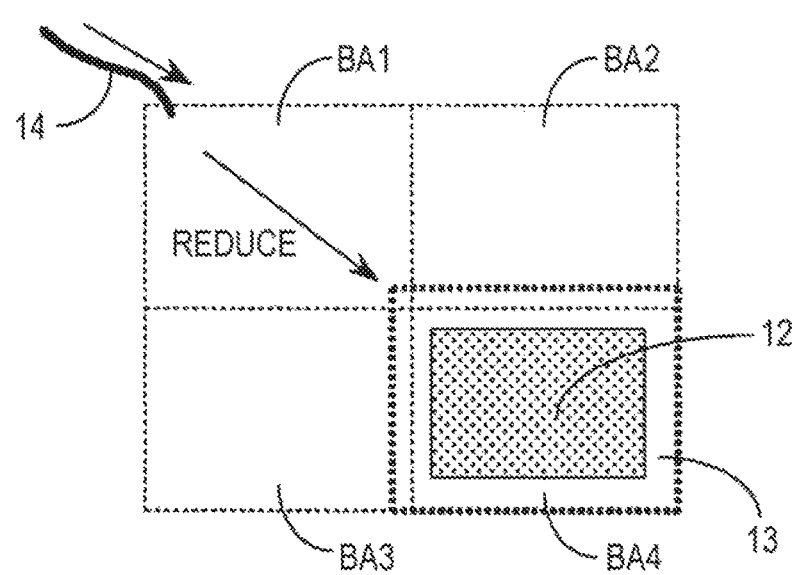

For example, in such a case as that shown in FIG. 7B where the touch history 14 moves and the touched position has entered the segmented region BA1, which is the upper left one of the four segmented regions of the near-field region NF, the sub-screen PIP is displayed after being reduced in the direction of the segmented region BA4, which lies in a diagonal direction of the segmented region BA1.

Figure 8A:
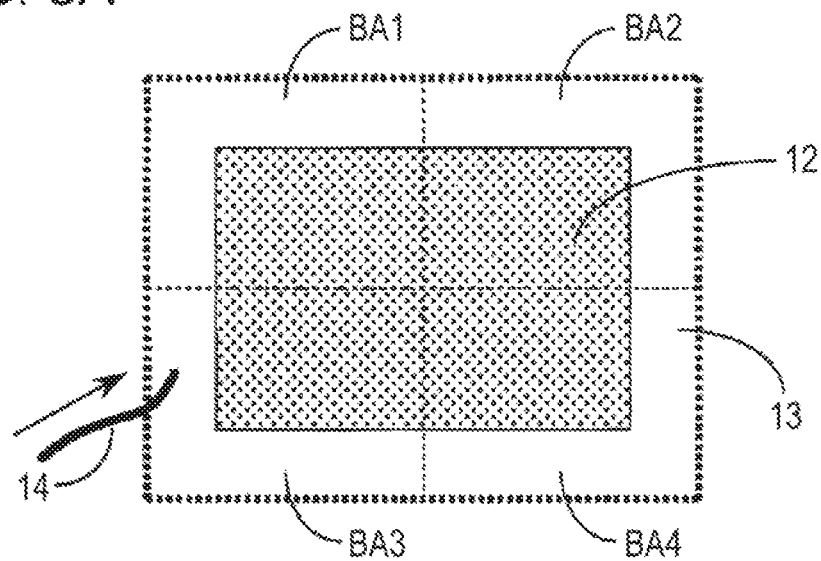
FIGS. 8A and 8B are explanatory diagrams of the display position, based on a touch history, of a second display screen (sub-screen) after reduction according to the embodiment of the present disclosure.
Figure 8B:
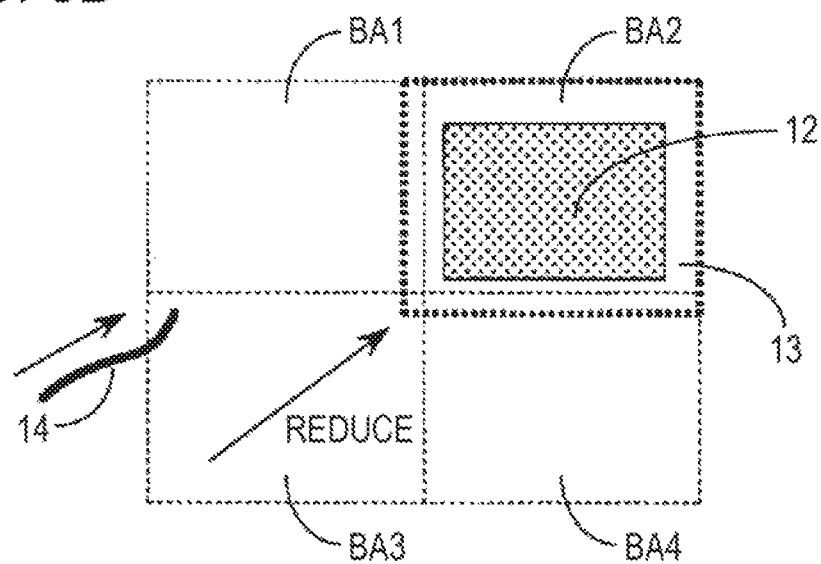

Further, FIG. 8A shows a case where the touch history 14 has moved from the left and the touched position has entered the segmented region BA3, which is the lower left one of the four segmented regions of the near-field region NF. In this case, it is the segmented region BA2 that lies in a diagonal direction of the segmented region BA3. Therefore, as shown in FIG. 8B, the sub-screen PIP is displayed after being reduced in the direction of the segmented region BA2.

Thus, reducing the sub-screen PIP in a diagonal direction of a segmented region of the near-field region NF that the touched position has entered prevents the sub-screen PIP after reduction from constituting an obstacle to touch input, even if the touch history 14 moves further inside the region in which the original sub-screen PIP was displayed. This allows the user to continue the input without performing a special operation.

Further, another method for determining the display position of a sub-screen PIP after reduction may include predicting, from information on a plurality of touched positions included in the touch history information, the direction of travel of the position to be touched in the future and determining, as the position in which to display the sub-screen PIP reduced to a predetermined size, a position that is out of the direction of travel of the touched position. A time-series arrangement of information on a plurality of touched positions included in the touch history information shows the direction of travel of the touch history 14 until the present time, thus making it possible to predict the direction of travel of the touch history 14 in the future.

Figure 9A:
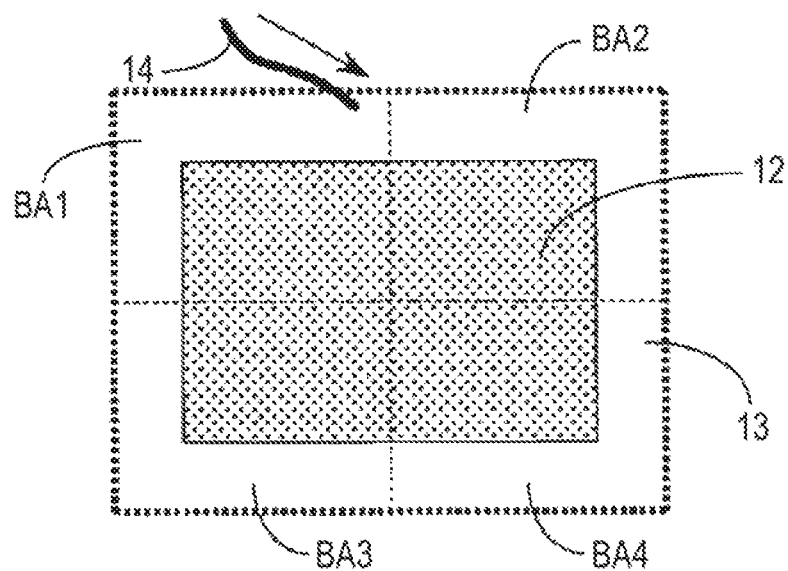
FIGS. 9A and 9B are explanatory diagrams of the display position, based on a touch history, of a second display screen (sub-screen) after reduction according to the embodiment of the present disclosure.
Figure 9B:
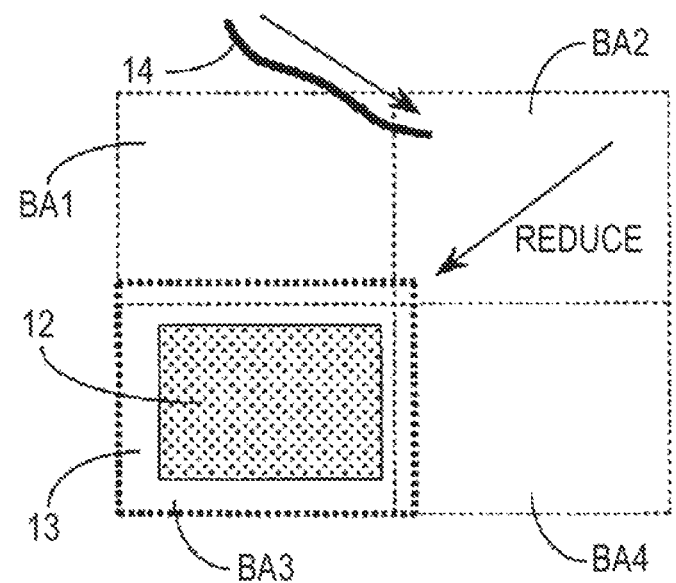

FIG. 9A shows a case where the touch history 14 has moved from the upper left and the touched position has entered the segmented region BA1, which is the upper left one of the four segmented regions of the near-field region NF. In this case, the position of entrance of the touch position is in a part of the segmented region BA1 that is close its neighbor segmented region BA2 on the right and the direction of movement of the touch history 14 is a diagonally downward right direction; therefore, it can be predicted that the direction of travel of the touch history 14 in the future is within the segmented region BA2. Accordingly, as shown in FIG. 9B, the sub-screen PIP is automatically reduced in the direction of the lower left segmented region BA3, to which the touch history 14 is considered to be not likely to travel in the future.

Thus, checking the position of a segmented region of the near-field region that the touched position has entered and the direction of movement of the touch history 14, predicting the direction of travel of the touch history 14 in the future, and thereby reducing the sub-screen PIP in the direction in which the touch history 14 is considered to be not likely to travel in the future prevents the sub-screen PIP after reduction from constituting an obstacle to touch input, even if the touch history 14 moves further inside the region in which the original sub-screen PIP was displayed. This allows the user to continue the input without performing a special operation.

As shown in FIG. 5C described above, by automatically reducing the sub-screen PIP in the lower right direction in the display region of the main screen MD, it is made possible to continue the input operation with the input pen for a while in a position that does not overlap the sub-screen PIP after reduction.

Figure 5D:
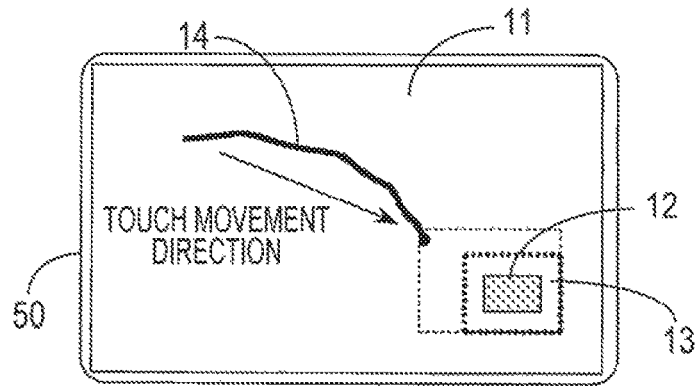

Further, in a case where it is possible to further reduce the sub-screen PIP, it is only necessary to, in a case where the touched position has entered the near-field region NF shown in FIG. 5C, automatically reduce the sub-screen PIP further in the lower right direction in the display region of the main screen MD as shown in FIG. 5D. In the case shown in FIG. 5D, the sub-screen PIP in the initial position shown in FIG. 5A has been reduced in two stages. That is, in a case where the process of reducing the sub-screen PIP is performed, the sub-screen PIP may be displayed after being gradually reduced more than once to the determined position of reduction.

Note, however, that in a case where the sub-screen PIP has been reduced once and cannot be further reduced, the sub-screen PIP is moved as shown in FIGS. 6A to 6D. As with FIG. 5C, FIG. 6A shows a state where the sub-screen PIP has been reduced.

Figure 6B:
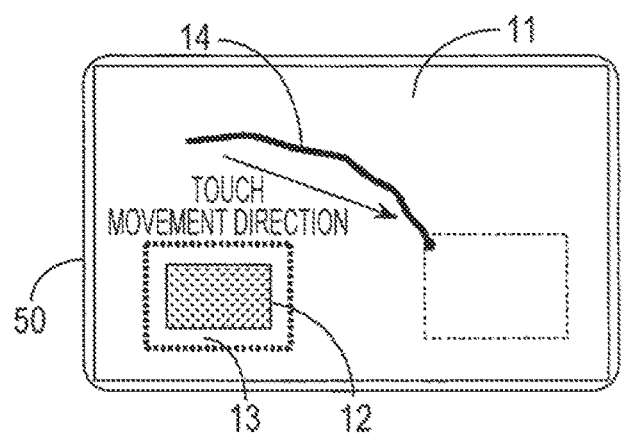

In a case where the touch history 14 further travels in the lower right direction from this state and the touched position has entered the near-field region NF shown in FIG. 6A, the sub-screen PIP is moved, as shown in FIG. 6B, in the direction of a region that has been free of the touch history 14 until the present time.

Figure 10A:
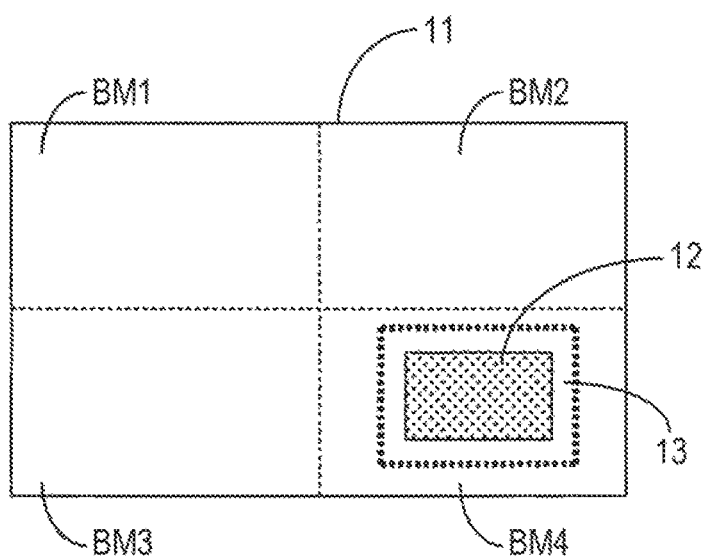
FIGS. 10A to 10C are explanatory diagrams of the display position, based on a touch history, of a second display screen (sub-screen) after movement according to the embodiment of the present disclosure.

FIGS. 10A to 10C and FIGS. 11A and 11B are explanatory diagrams of the display position, based on a touch history, of a second display screen (sub-screen) after movement according to the embodiment of the present disclosure. Here, two display positions of a sub-screen PIP after movement are shown. FIG. 10A shows four segmented regions (BM1 to BM4) into which the main screen MD has been segmented in vertical and horizontal directions. Further, FIG. 10A shows a state where the sub-screen PIP is displayed in the segmented region BM4, which is the lower right one of the four-segmented regions, and a near-field region NF is also included in the segmented region BM4.

A method for determining the display position of a sub-screen PIP after movement includes storing, in a time-series manner, segmented regions that the touch history 14 entered and moving the sub-screen PIP to a segmented region that the touch history 14 has not entered. That is, in a case where it has been confirmed, with reference to the information on the plurality of touched positions included in the touch history information, that the display region of the first display screen (main screen) includes a segmented region that has not been touched until the present time since a touch was started, the segmented region that has not been touched is determined as a region to which the sub-screen PIP is moved. Alternatively, in a case where there is no segmented region that has not been touched, the sub-screen PIP needs only be moved to the segmented region touched at the most distant time.

Figure 10B:
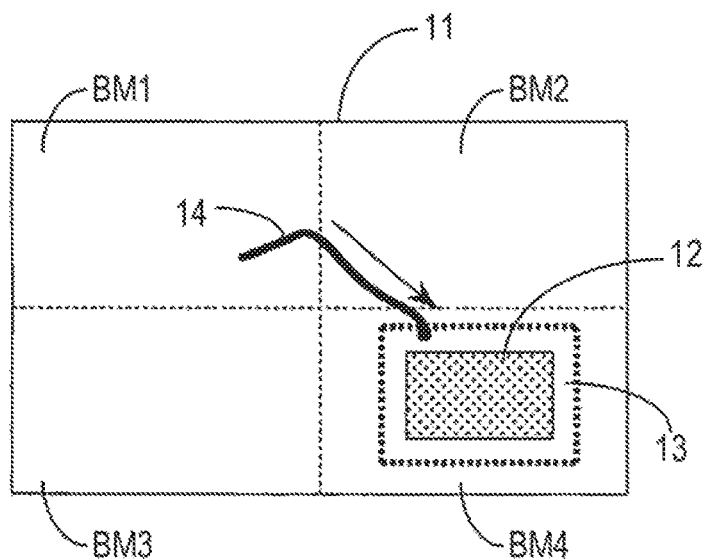

Assume that in a state where the sub-screen PIP is displayed in the lower right segmented region BM4 as shown in FIG. 10A, touch input is started in the upper left segmented region of the main screen MD and the touch history 14 enters the segmented region BM2 from the segmented region BM1 and further enters the near-field region NF in the segmented region BM4 as shown in FIG. 10B. In this case, the touch history 14 has moved through three segmented regions (BM1, BM2, and BM4) but has not entered the lower left segmented region BM3 yet.

Figure 10C:
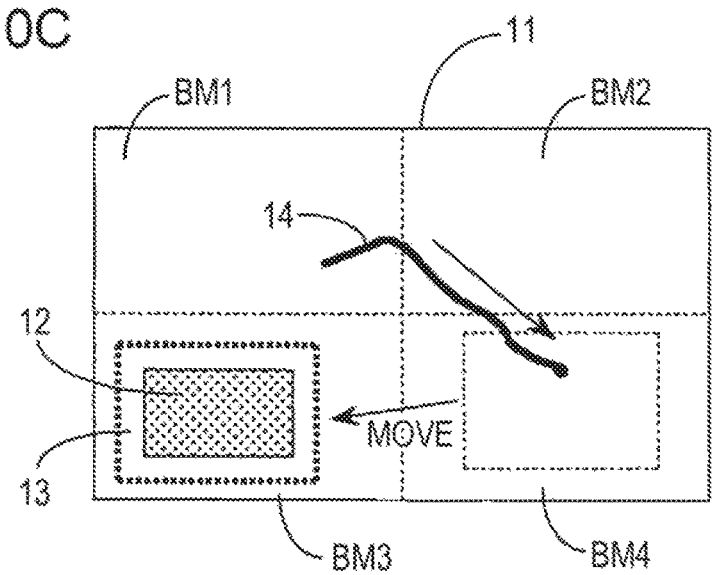

Accordingly, as shown in FIG. 10C, the sub-screen PIP is moved to the lower left segmented region BM3, on which no touch input has been performed. At this time, there is no change in the size of the sub-screen PIP.

Thus, in a case where the touch history 14 has entered the near-field region NF of the sub-screen PIP and there is a segmented region on which no touch input has been performed yet since the start of touch input, moving the sub-screen PIP to the segmented region prevents the sub-screen PIP after movement from constituting an obstacle to the touch input, even if the touch history 14 moves further inside the segmented region in which the original sub-screen PIP was displayed. This allows the user to continue the input without performing a special operation.

Further, in a case where there is no segmented region on which no touch input has been performed since the start of touch input, the sub-screen PIP is moved to the segmented region touched at the most distant time from the time-series perspective of the touch history 14. This makes it possible to move the sub-screen PIP to a segmented region that is far from the segmented region on which touch input has been performed most recently and that is considered to be not likely to receive touch input in the future.

Further, another method for determining the display position of a sub-screen PIP after movement may include predicting, from information on a plurality of touched positions included in the touch history information, the direction of travel of the position to be touched in the future and determining, as the position to which the sub-screen PIP is moved, a position that is out of the direction of travel of the touched position. A time-series arrangement of information on a plurality of touched positions included in the touch history information shows the direction of travel of the touch history 14 until the present time, thus making it possible to predict the direction of travel of the touch history 14 in the future.

Figure 11A:
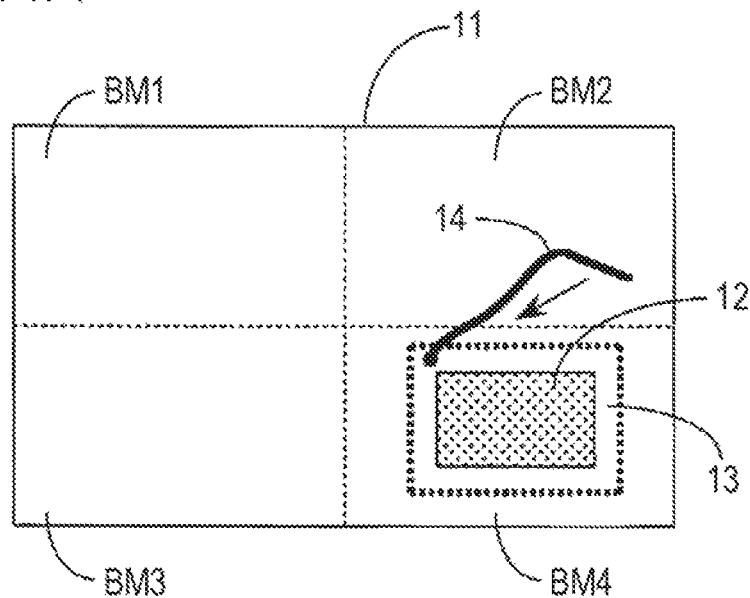
FIGS. 11A and 11B are explanatory diagrams of the display position, based on a touch history, of a second display screen (sub-screen) after movement according to the embodiment of the present disclosure.

FIG. 11A shows a case where the touch history 14 has moved inside the upper right segmented region BM2 and entered the lower right segmented region BM4 from above the segmented region BM4 and the touched position has entered the near-field region NF in the segmented region BM4.

Figure 11B:
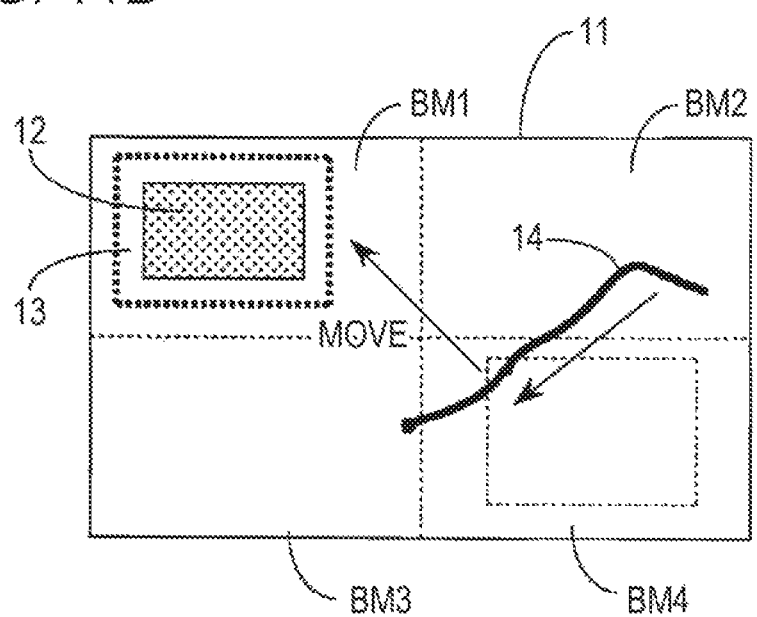

In this case, the time-series direction of movement of the touch history 14 is a diagonally downward left direction; therefore, it can be predicted that the direction of travel of the touch history 14 in the future is similarly a diagonally downward left direction. That is, it is predicted that the touch history 14 is highly likely to move from the segmented region BM4 to the lower left segmented region BM3 in the future and is not likely to move to the upper left segmented region BM1 in the future. Therefore, although the two left segmented regions (BM1 and BM3) are both segmented regions on which no touch input has been performed yet, the sub-screen PIP is moved to the upper left segmented region BM1 as shown in FIG. 11B.

In such a case where the touch history 14 has entered the near-field region NF of the sub-screen PIP, predicting the direction of the touch history 14 in the future and moving the sub-screen PIP to a segmented region considered not to lie in the direction of movement in the future prevents the sub-screen PIP after movement from constituting an obstacle to touch input, even if the touch history 14 moves further inside the segmented region in which the original sub-screen PIP was displayed. This allows the user to continue the input without performing a special operation.

In the case shown in FIG. 6B described above, the touch start position is in the upper segmented region of the main screen MD, the direction of movement of the touch history 14 until the present time is a downward right direction, and no touch input has been performed on the lower left segmented region; therefore, the sub-screen PIP is moved to the lower left segmented region, on which no touch input has been performed. As shown in FIG. 6B, by automatically moving the sub-screen PIP in a lower left direction in the display region of the main screen MD, it is made possible to continue the input operation with the input pen for a while in a position that does not overlap the sub-screen PIP after movement.

Figure 6C:
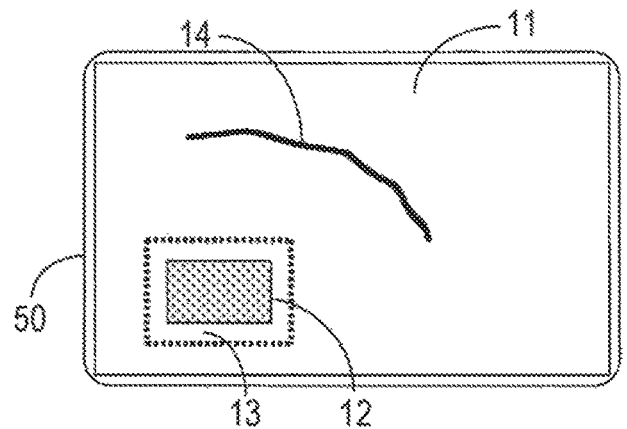
Figure 6D:
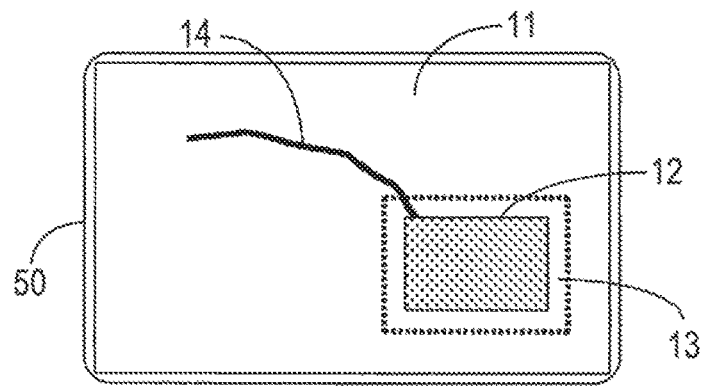

FIGS. 6C and 6D show a case where the sub-screen PIP is returned to the initial position shown in FIG. 5A. In a case where the input pen has ended the touch (touch up), there is a case where it is preferable to return the sub-screen PIP to the initial position in order to confirm the display content of the sub-screen PIP. Accordingly, in a case where the touch detection section 25 has not acquired information on a touched position for a predetermined period of time or longer since the sub-screen PIP was reduced or moved, the initial position information 61 is utilized to return the sub-screen PIP to the display position in which the sub-screen PIP was first displayed.

Assume, for example, that the input pen has ended the touch (touched up) in the state shown in FIG. 6B and a predetermined period of time (e.g. 5 seconds) has elapsed in a state where a line segment inputted by the input pen is displayed as shown in FIG. 6C. At this time, it is determined that there is no touch with the input pen in the future, and as shown in FIG. 6D, the sub-screen PIP is automatically returned to the initial position shown in FIG. 5A. Further, the size of the sub-screen PIP is returned to the same size as that of the sub-screen PIP in the initial position shown in FIG. 5A.

Thus, in a case where there is no longer touch input from the input pen, the user, without performing a special operation, returns the sub-screen PIP to the initial position while the main screen MD is displaying the information inputted thereto. This makes it impossible to, in a case where the sub-screen PIP overlaps a part of the information inputted to the main screen MD, see the information in the overlapped position, but makes it possible to confirm the information on the sub-screen PIP in its original size.

Further, in a case where returning the sub-screen PIP to the initial position causes the sub-screen PIP to overlap a part of the information inputted to the main screen MD, it is possible to return the sub-screen PIP to the initial position a predetermined period of time after a warning display indicating that the sub-screen PIP overlaps a part of the input information. In a case where, during the warning display, the user has performed input to cancel the returning of the sub-screen PIP to the initial position, the display shown in FIG. 6C may be kept unchanged without the sub-screen PIP being returned to the initial position.

Alternatively, it is possible to return the sub-screen PIP to the initial position in a case where the sub-screen PIP in the initial position overlaps none of the information inputted to the main screen MD. Furthermore, in a case where the initial position of the sub-screen PIP overlaps a part of the information inputted to the main screen MD, it is possible to move the sub-screen PIP to a region, if any, on the main screen MD where the sub-screen PIP of the original size does not overlap the information inputted to the main screen MD.

Process of Reducing and Moving Sub-Screen Through Position Input Device (Touch Panel)

Figure 12A:
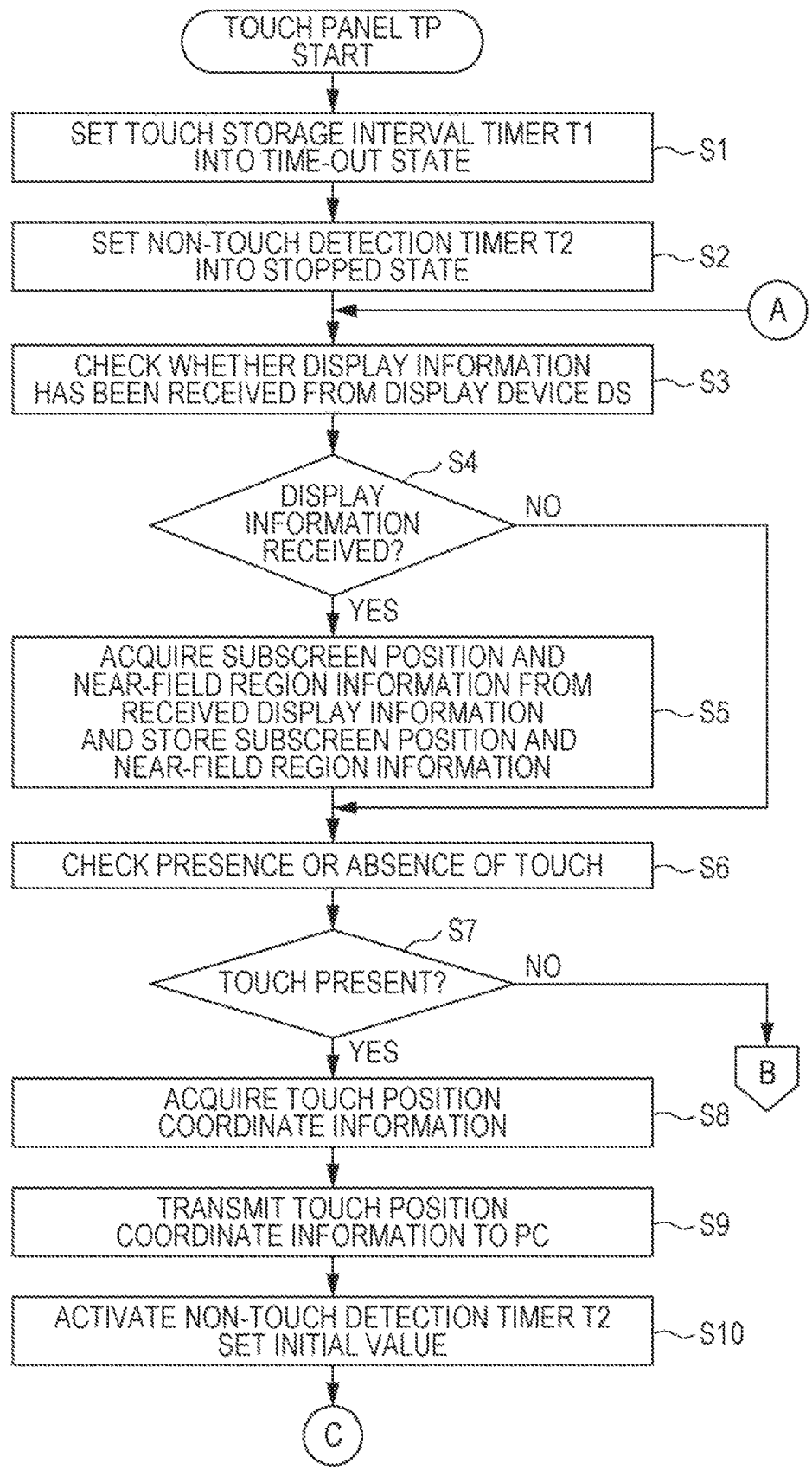
FIGS. 12A and 12B are flow charts of a process of, for example, reducing a sub-screen through the position input device (touch panel) according to the embodiment of the present disclosure.
Figure 12B:
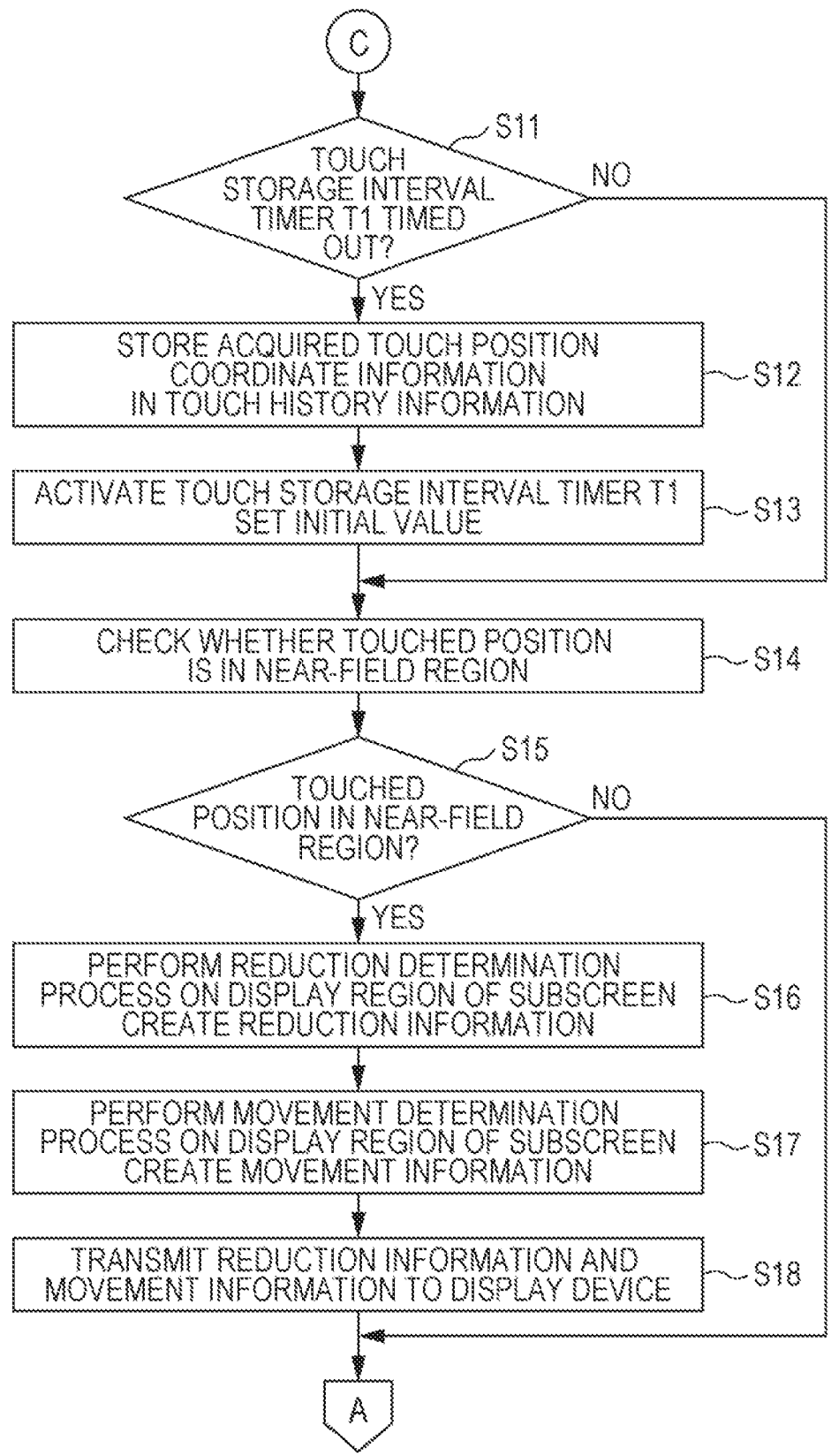
Figure 13:
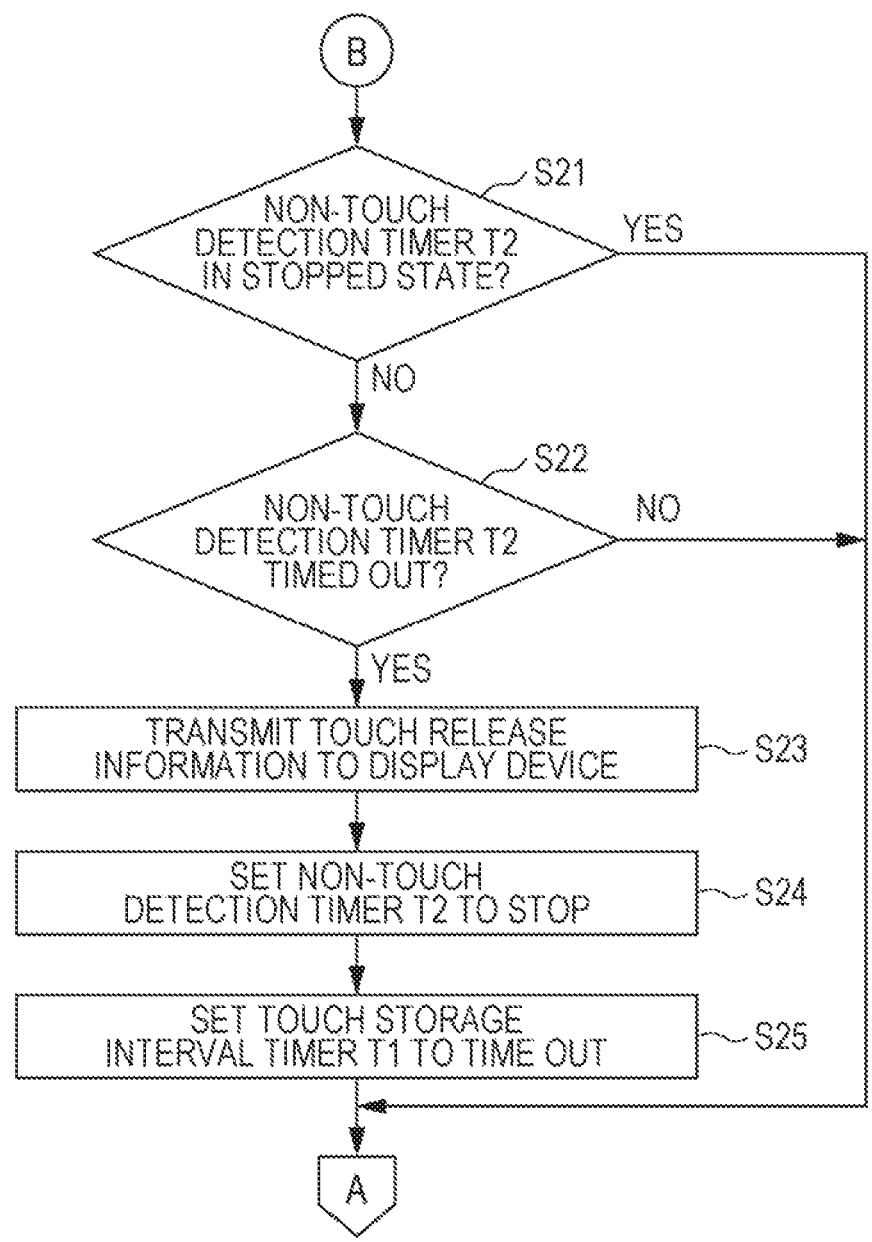
FIG. 13 is a flow chart of the process of, for example, reducing a sub-screen through the position input device (touch panel) according to the embodiment of the present disclosure.

FIGS. 12A and 12B and FIG. 13 are flow charts of a process of, for example, reducing a sub-screen through the position input device 20 (touch panel TP) according to the embodiment of the present disclosure. In the embodiment shown here, reduction information and movement information are created by performing both a reduction determination process and a movement determination process on a display region of a sub-screen PIP in a case where a touched position is present in a near-field region of the sub-screen PIP. Note, however, that it is also possible to first create the reduction information by performing the reduction determination process and then create the movement information by performing the movement determination process after having reduced the sub-screen PIP.

In step S1 of FIG. 12A, the input control section 21 sets a touch storage interval timer T1 into a time-out state. The touch storage interval timer T1 is a timer that measures time intervals at which touched positions are stored in the touch history information 31. Every time the touch storage interval timer T1 times out, acquired information on the coordinates of an acquired touched position is stored in the touch history information 31. The time that the touch storage interval timer T1 measures is for example 100 milliseconds.

In step S2, the input control section 21 sets a non-touch detection timer T2 into a stopped state. The non-touch detection timer T2 is a timer that measures the time during which the touch panel TP is not touched. In a case where the non-touch detection timer T2 has timed out, touch release information is transmitted to the display device DS, so that the non-touch detection timer T2 is set into a stopped state.

In step S3, the communication section 23 checks whether display information that is transmitted from the display device DS is received. As described above, the display information is information including a sub-screen position 35 and near-field region information 36. In a case where the display information is received in step S4, the process proceeds to step S5, and in a case where the display information is not received in step S4, the process proceeds to step S6. In step S5, the display information acquisition section 24 acquires the sub-screen position 35 and the near-field region information 36 from the display information thus received and stores them in the storage section 30. This allows the touch panel TP to recognize the display position and size of the sub-screen PIP currently displayed on the display device DS and the position and size of the near-field region.

In step S6, the touch detection section 25 checks the presence or absence of a touch on the touch panel TP. In a case where there is a touch on the touch panel TP in step S7, the process proceeds to step S8, and in a case where there is no touch on the touch panel TP in step S7, the process proceeds to step S21 of FIG. 13.

In step S8, the input control section 21 acquires information on the coordinates of the touched position. In step S9, the touch information transmission section 22 transmits the information on the coordinates of the touched position to the information processing device PC. In step S10, the non-touch detection timer T2 is set to the initial value of measurement time and activated.

In step S11, a check is made to determine whether the touch storage interval timer T1 is in a time-out state. In a case where the touch storage interval timer T1 has timed out, the process proceeds to step S12, and in a case where the touch storage interval timer T1 has not timed out, the process proceeds to step S14. In step S12, the touched position coordinate information thus acquired is stored in the touch history information 31. In step S13, the touch storage interval timer T1 is set to the initial value of measuring time and activated.

In step S14, the touch position determination section 26 checks whether the position touched is in a near-field region indicated by the near-field region 36 stored. In a case where, in step S15, the touched position is in the near-field region, the process proceeds to step S16, and in a case where, in step S15, the touched position is not in the near-field region, the process returns to step S3.

In step S16, the display position determination section 27 creates reduction information by performing a reduction determination process on the display region of the sub-screen PIP. In this step, the touch history information 31 stored in utilized to, as shown in FIGS. 7A to 7C, FIGS. 8A and 8B, and FIGS. 9A and 9B, determine a display region in a case of reducing the sub-screen PIP and create reduction information. The reduction information is information pertaining to the display position and near-field region of the sub-screen PIP after reduction.

In step S17, the display position determination section 27 creates movement information by performing a movement determination process on the display region of the sub-screen PIP. In this step, the touch history information 31 stored in utilized to, as shown in FIGS. 10A to 10C and FIGS. 11A and 11B, determine a display region in a case of moving the sub-screen PIP and create movement information. The movement information is information pertaining to the display position and near-field region of the sub-screen PIP after movement.

In step S18, the reduction information notification section 28 and the movement information notification section 29 transmit the reduction information and movement information thus created to the display device DS, respectively. After that, the process returns to step S3 and the same process is repeated.

In step S21 of FIG. 13, a check is made to determine whether the non-touch detection timer T2 is in a stopped state. In a case where the non-touch detection timer T2 is not in a stopped state, the process proceeds to step S22, and in a case where the non-touch detection timer T2 is in a stopped state, the process returns to step S3 of FIG. 12A. In step S22, a check is made to determine whether the non-touch detection timer T2 is in a time-out state. In a case where the non-touch detection timer T2 is not in a time-out state, the process proceeds to step S23, and in a case where the non-touch detection timer T2 is not in a time-out state, the process returns to step S3 of FIG. 12A.

In step S23, since the continuation of the non-touch state of a touch for a predetermined period of time or longer has been detected, touch release information indicating that a touch release (touch-up) has occurred is transmitted to the display device DS. In step S24, the non-touch detection timer T2 is set into a stopped state. In step S25, the touch storage interval timer T1 is set into a time-out state. After that, the process returns to step S3 of FIG. 12A and the same process is repeated.

Thus, in a case where touched positions are acquired and stored as the touch history information 31 at regular intervals and it is determined that a touched position is in the near-field region of the sub-screen PIP, the touch history information 31 is utilized to perform a reduction determination process and a movement determination process to determine the position and size to which the sub-screen PIP should be reduced and the position to which the sub-screen PIP should be moved, and reduction information and movement information are notified to the display device DS. With this, in a case where the touch history approaches the sub-screen PIP, the position to which the sub-screen PIP should be reduced in a case where it is reduced and the position to which the sub-screen PIP should be moved are notified to the display device DS, so that a reduction or movement of the sub-screen PIP is executed in the display device DS. Therefore, even without performing a special operation except for touch input with an input pen, the user can continue the input without the sub-screen PIP constituting an obstacle to the input operation.

Process of Reducing and Moving Sub-Screen Through Information Display Device

Figure 14A:
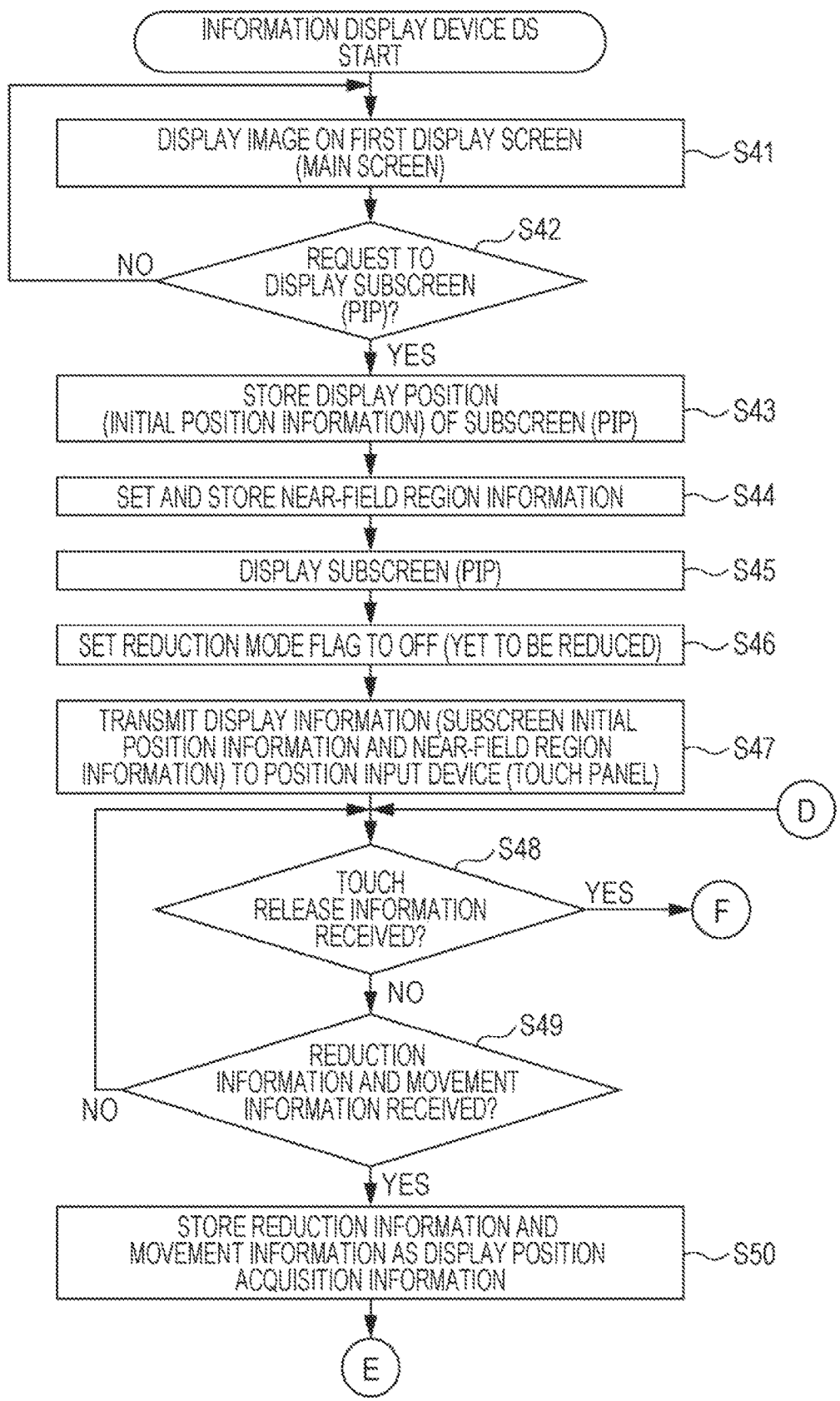
FIGS. 14A and 14B are flow charts of a process of, for example, reducing a sub-screen through the information display device according to the embodiment of the present disclosure.
Figure 14B:
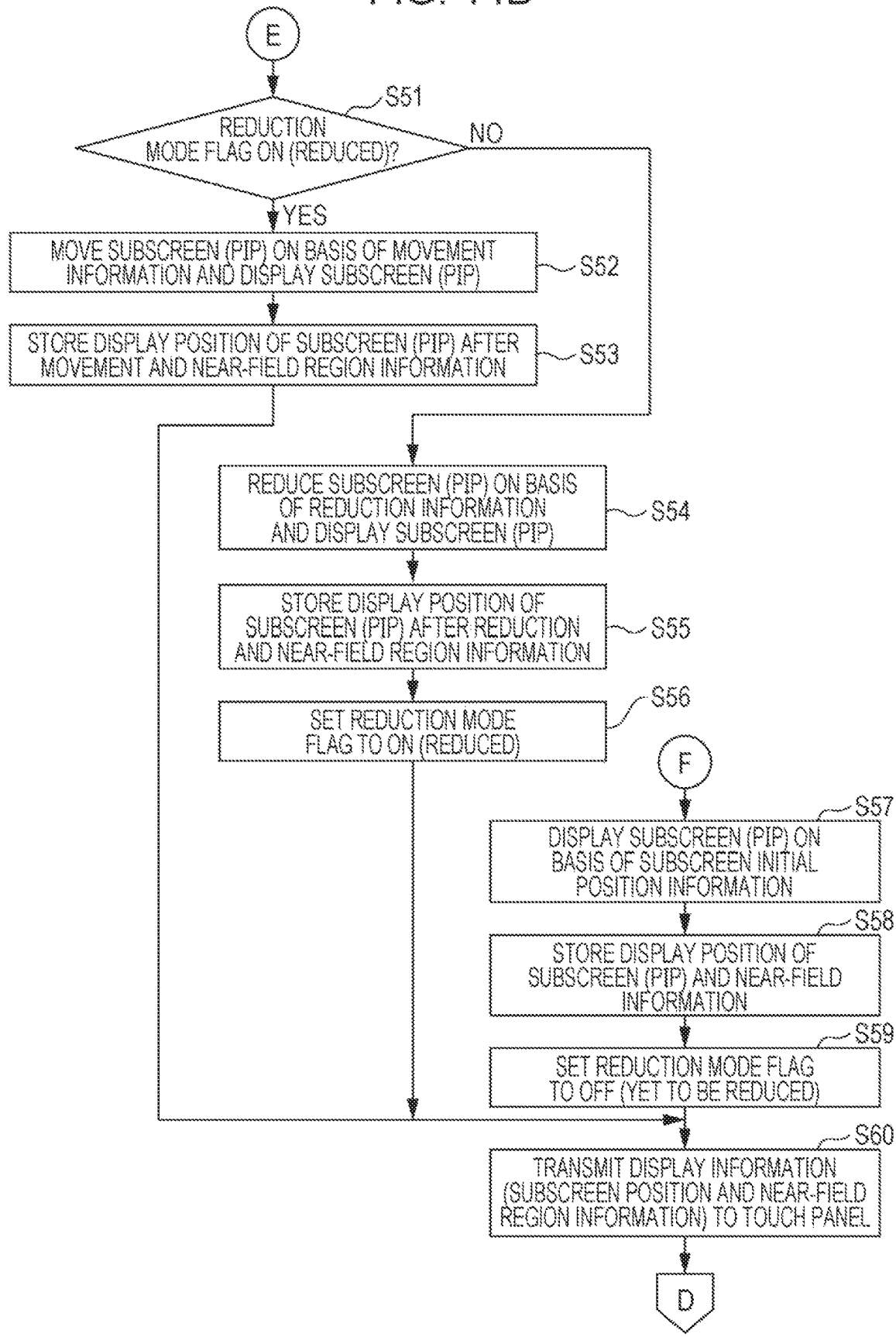

FIGS. 14A and 14B are flow charts of a process of, for example, reducing a sub-screen through the information display device according to the embodiment of the present disclosure.

Assume here that a user performs a predetermined input operation with a remote controller or the like to transmit, to the display device DS, a request to display a sub-screen PIP in a part of the main screen MD. In a case where reduction information and movement information have been transmitted from the touch panel TP while a sub-screen PIP is being displayed on the display device DS, the sub-screen PIP is reduced on the basis of the reduction information first and, in a case where the sub-screen PIP has already been reduced, the sub-screen PIP is moved on the basis of the movement information. Further, in a case where a touch release (touch-up) has occurred, the display position of the sub-screen PIP is returned to the initial position.

In step S41, the display control section 51 displays a predetermined image on the first display screen (main screen MD) of the display panel 52. This image is for example an image that is generated by the image processing section 55 on the basis of an image signal that is supplied from the information processing device PC and inputted from the image input section 54.

In step S42, the display control section 51 checks whether, as a result of the user's predetermined input operation, there is a request to display a sub-screen PIP. A request to display a sub-screen PIP includes information pertaining to the display position and size of the sub-screen PIP and image data to be displayed on the sub-screen PIP. In a case where a request to display a sub-screen PIP has been received, the process proceeds to step S43, and in a case where no request to display a sub-screen PIP has been received, the process returns to step S41.

In step S43, the display position (initial position information 61) of the sub-screen PIP is stored in the storage section 60. In step S44, the initial position information 61 of the sub-screen PIP is utilized to set a near-field region NF of the sub-screen PIP, and the near-field region NF is stored as near-field region information 64 in the storage section 60. In step S45, the display control section 51 displays the sub-screen PIP on the display panel 52. The current display position of the sub-screen PIP thus displayed in stored as a sub-screen position 63 in the storage section 60. The sub-screen position 63 and the near-field region information 64 are equivalent to display information 62.

In step S46, a reduction mode flag is set to OFF (yet to be reduced). The reduction mode flag is information that indicates whether the sub-screen PIP has ever been reduced. For example, in a case where the sub-screen PIP has been reduced, information indicating ON (reduced) is set, and in a case where the sub-screen PIP has not been reduced yet, information indicating OFF (yet to be reduced) is set.

In step S47, the communication section 56 transmits the display information 62 thus stored to the touch panel TP. In this step, the sub-screen position 63, which is equivalent to the initial position information 61 of the sub-screen PIP, and the near-field region information 64 are transmitted to the touch panel TP. In step S48, a check is made to determine whether touch release information has been received from the touch panel TP. In a case where touch release information has been received, the process proceeds to step S56, and in a case where no touch release information is received, the process proceeds to step S49.

In step S49, a check is made to determine whether the display position acquisition section 57 has received reduction information and movement information from the touch panel TP. In a case where reduction information and movement information have been received, the process proceeds to step S50, in which the reduction information and movement information thus received are stored as display position acquisition information 65 in the storage section 60. On the other hand, in a case where no reduction information or movement information is received, the process returns to step S48. In step S51, a check is made to determine whether the reduction mode flag is ON (reduced). In a case where the reduction mode flag is ON (reduced), the process proceeds to step S52, and in a case where the reduction mode flag is OFF (yet to be reduced), the process proceeds to step S54.

In step S52, since the reduction mode flag is ON (reduced) and the sub-screen PIP has already been reduced, the movement process section 59 moves the sub-screen PIP on the basis of the movement information thus received and displays the sub-screen PIP. In step S53, display information 62 including the display position 63 of the sub-screen PIP after movement and near-field region information 64 is stored in the storage section 60. After that, the process proceeds to step S60, in which the display information 62 thus stored is transmitted to the touch panel TP. After that, the process returns to step S48 and the same process is repeated.

In step S54, since the reduction mode flag is OFF (yet to be reduced) and the sub-screen PIP has not been reduced yet, the reduction process section 58 reduces the sub-screen PIP on the basis of the reduction information thus received and displays the sub-screen PIP. In step S55, display information 62 including the display position 63 of the sub-screen PIP after reduction and near-field region information 64 is stored in the storage section 60. In step S56, the reduction mode flag is set to ON (reduced). After that, the process proceeds to step S60, in which the display information 62 thus stored is transmitted to the touch panel TP. After that, the process returns to step S48 and the same process is repeated.

In step S57, since the touch release information has been received, the sub-screen PIP is returned to the initial display state. That is, the sub-screen PIP is displayed on the basis of the stored initial position information 61 of the sub-screen PIP. In step S58, display information 62 including the display position 63 of the sub-screen PIP returned to the initial display state and near-field region information 64 is stored in the storage section 60. In step S59, the reduction mode flag is set to OFF (yet to be reduced). After that, the process proceeds to step S60, in which the display information 62 thus stored is transmitted to the touch panel TP. After that, the process returns to step S48 and the same process is repeated.

Modifications

Modification 1

The embodiment described above has mainly shown one in which smooth continuation of touch input on the main screen MD without discontinuation of a user's touch input operation is allowed by moving the second display screen (sub-screen PIP) after having reduced the sub-screen PIP.

Note, however, the embodiment described above does not imply any limitation, provided smooth continuation of touch input on the main screen MD is allowed even while the sub-screen PIP is being displayed.

For example, the sub-screen PIP may be made gradually smaller by performing only a gradual reduction process more than once. Alternatively, a movement process may be first performed after the sub-screen PIP has been reduced at the maximum reduction ratio set in advance. Alternatively, the sub-screen PIP may be moved first and then be reduced in the position to which it has been moved.

Furthermore, a reduction process and a movement process may be alternately performed on the sub-screen PIP more than once, and regardless of the order of a reduction process and a movement process, a plurality of reduction processes and a plurality of movement processes may be combined as appropriate. Further, while the settings may be configured in advance as to which processing method to utilize as the method for processing a sub-screen PIP, the user may be allowed to freely configure the settings for the processing method to be used.

Modification 2

Although the embodiment described above has shown an embodiment in which the sub-screen PIP is first reduced and then moved, this is not the only process that is performed on the sub-screen PIP. The process may be combined with a process of making the sub-screen PIP transparent by lightening the display color of the sub-screen PIP and a process of temporarily erasing the sub-screen PIP. For example, the reduction process, the movement process, the transparency process, and the temporary erasure process may be performed in this order.

Modification 3

Although the flow charts shown in FIGS. 12A and 12B, FIG. 13, and FIGS. 14A and 14B of the embodiment described above have shown one in which after the touch panel TP has determined a position of reduction and a position of movement, the touch panel TP transmits both the position of reduction and the position of movement to the display device DS and the display device DS performs a reduction process first and then performs a movement process, this does not imply any limitation.

For example, in a case where the touch panel TP has determined which of the reduction process and the movement process is performed and has determined that the reduction process is performed, the touch panel TP transmits only information on the position of reduction to the display device DS. On the other hand, in a case where the touch panel TP has determined that the movement process is performed, the touch panel TP transmits only information on the position of movement to the display device DS and the display device DS needs only perform the reduction process or the movement process on the basis of the received information on the position of reduction or the received information on the position of movement.

Modification 4

Although the embodiment described above has shown one in which, since the sub-screen PIP is first reduced and then moved, the size of the sub-screen PIP after movement is the same as the size of the sub-screen PIP after reduction as shown in FIG. 6B, this does not imply any limitation.

For example, the size of the sub-screen PIP after movement may be returned to the same size as that in which the sub-screen PIP was displayed in the initial position. Further, the size of the sub-screen PIP after movement may be adjusted in view of an image or the like surrounding the display position of the sub-screen PIP after movement.

Modification 5

Although the embodiment described above has shown one in which the first display screen (main screen MD) is segmented into four segmented regions and the sub-screen PIP is displayed in any of the four segmented regions, this does not imply any limitation. For example, it is possible to set the number n of segmented regions at 5 or larger, utilize the touch history information to extract such a segmented region from among the n (>4) segmented regions as to allow smooth continuation of touch input, and move the sub-screen PIP to the segmented region thus extracted.

Modification 6

The embodiment described above has shown one in which the sub-screen PIP is returned to the initial display state in a case where there has been no touch input for a predetermined period of time or longer. Note, however, that when the sub-screen PIP is returned to the initial display state, there is a case where a line segment or an image has already been displayed by touch input in the initial display position of the sub-screen PIP. In this case, as a method for returning the sub-screen PIP to the initial display state, any of the following measures need only be taken, for example.

First, even if a line segment or an image has already been displayed in the initial display position of the sub-screen PIP, the sub-screen PIP is displayed over the line segment or the like. Further, in a case where, if the sub-screen PIP is returned to the initial display position, the sub-screen PIP overlaps the line segment or the image already inputted by touch, a warning display or a warning sound may be used prior to the returning of the sub-screen PIP to the initial display state to notify the user that there is a line segment or the like that the sub-screen PIP overlaps.

After that, in a case where there is input from the user meaning that the returning of the sub-screen PIP to the initial display state is not permitted, the sub-screen PIP is not returned to the initial display state. On the other hand, in a case where there is input from the user meaning that the returning of the sub-screen PIP to the initial display state is permitted, the sub-screen PIP needs only be returned to the initial display state.

Further, in a case where, if the sub-screen PIP is returned to the initial display position, the sub-screen PIP overlaps the line segment or the image already inputted by touch and in a case where a region in which the sub-screen PIP of the size in the initial display state does not overlap information displayed on the main screen MD is present on the main screen MD, the sub-screen PIP may be moved to the region. Further, the sub-screen PIP may be returned to the initial display state only in a case where, if the sub-screen PIP is returned to the initial display position, the sub-screen PIP does not overlap the line segment or the image already inputted by touch.

The present disclosure contains subject matter related to that disclosed in Japanese Priority Patent Application JP 2017-057501 filed in the Japan Patent Office on Mar. 23, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A display apparatus with an input function, comprising:
a position input device through which to input information on a touched position; and
a information display device that displays information,
the position input device and the information display device being placed on top of each other,
wherein the information display device includes
a display panel that displays a first display screen and displays a second display screen in a display region of the first display screen, and
a movement process section that moves the second display screen,
the position input device includes
a touch detection section that acquires the information on the touched position in handwriting input,
a second storage section storing touch history information including information on a plurality of the touched positions thus acquired, and
a display position determination section that, in a case where the touched position determination section has determined that the touched position of a newly acquired handwriting input is present in a near-field region, utilizes the touch history information to determine position to which the second display screen is moved.

2. The display apparatus with an input function according to claim 1, wherein the information display device further includes
a first storage section storing display information including a display position of the second display screen and information on the near-field region including the second display screen and having a larger region than the second display screen, and
a first communication section that transmits the display information stored in the first storage section to the position input device,
the position input device includes a second communication section that receives the display information, and
the second communication section transmits, to the information display device, the information on the position at which the second display screen determined by the display position determination section moves.

3. The display apparatus with an input function according to claim 1, wherein the position input device acquires the position of the second display screen included in the display information received from the display device and information of the near area, and stores the information in the second storage section.

4. The display apparatus with an input function according to claim 1, wherein the display position determination section predicts, from the information on the touched positions included in the touch history information, a direction of travel of a position that is to be touched at a future time and determines, as the position to which the second display screen is moved, a position that is out of the direction of travel of the touched position.

5. The display apparatus with an input function according to claim 1, wherein in a case where the display position determination section has confirmed, with reference to the information on the touched positions included in the touch history information, that the display region of the first display screen includes a region that has not been touched until a present time since a touch was started, the display position determination section determines, as the position to which the second display screen is moved, the region that has not been touched.

6. The display apparatus with an input function according to claim 1, wherein the display position determination section determines the area having the oldest touched time as a position to move the second display screen, when there is no area that has never been touched since the start of the touch, by using information on a plurality of touch positions included in the touch history information.

7. The display apparatus with an input function according to claim 1, wherein the near-field region is a region that has, around a display region of the second display screen, a width that is larger by a predetermined distance.

8. The display apparatus with an input function according to claim 1, wherein the first storage section stores initial display position information indicating a display position in which the second display screen was first displayed, and
in a case where the touch detection section has not acquired information on a touched position for a predetermined period of time or longer since the second display screen was reduced or moved, the initial display position information is utilized to return the second display screen to the display position in which the second display screen was first displayed.

* * * * *